(12) United States Patent
Petty

(10) Patent No.: US 6,333,986 B1
(45) Date of Patent: Dec. 25, 2001

(54) CEPSTRAL METHOD AND SYSTEM FOR DETECTING/CLASSIFYING OBJECTS FROM AIR-BASED OR SPACE-BASED IMAGES

(75) Inventor: Joe V. Petty, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/075,100

(22) Filed: May 8, 1998

(51) Int. Cl.[7] .................................................. G06K 9/00
(52) U.S. Cl. ........................ 382/103; 250/330; 342/25; 342/53
(58) Field of Search ..................... 382/100, 103, 382/109, 250, 260, 275, 276, 278–279, 280; 342/22–27, 192–193, 196, 53; 250/330

(56) References Cited

U.S. PATENT DOCUMENTS

| | | | |
|---|---|---|---|
| 3,614,778 | 10/1971 | Graham et al. | 342/25 |
| 4,052,889 | 10/1977 | Mucciardi et al. | 73/602 |
| 4,164,788 | 8/1979 | Jain | 382/280 |
| 4,241,350 | 12/1980 | Uffelman | 342/190 |
| 4,608,566 | 8/1986 | Ennis et al. | 342/28 |
| 4,655,228 | 4/1987 | Shimura et al. | 600/449 |
| 4,675,677 | 6/1987 | von Maydell et al. | 342/25 |
| 4,761,545 | 8/1988 | Marshall et al. | 250/291 |
| 4,829,306 | 5/1989 | Gjessing et al. | 342/159 |
| 4,858,124 | 8/1989 | Lizzi et al. | 600/443 |
| 4,864,307 | 9/1989 | Potage et al. | 342/192 |
| 5,047,968 | 9/1991 | Carrington et al. | 382/275 |
| 5,068,664 | 11/1991 | Appriou et al. | 342/90 |
| 5,068,666 | 11/1991 | Voles | 342/192 |
| 5,072,314 | 12/1991 | Chang | 359/559 |
| 5,159,474 | 10/1992 | Franke et al. | 359/29 |
| 5,339,080 | 8/1994 | Steinway et al. | 342/22 |
| 5,446,461 | 8/1995 | Frazier | 342/22 |
| 5,469,176 | 11/1995 | Sandler et al. | 342/375 |
| 5,502,444 | 3/1996 | Kohlberg | 342/22 |
| 5,546,084 | * 8/1996 | Hindman | 342/25 |
| 5,563,604 | * 10/1996 | Brandao et al. | 342/159 |
| 5,594,450 | 1/1997 | Schober | 342/159 |
| 5,614,907 | * 3/1997 | Kreitmair-Steck et al. | 342/25 |
| 5,659,318 | * 8/1997 | Madsen et al. | 342/25 |
| 5,721,694 | 2/1998 | Graupe | 364/574 |
| 5,729,465 | * 3/1998 | Barbaresco | 702/76 |
| 5,910,785 | * 6/1999 | Normant | 342/25 |
| 5,936,552 | * 8/1999 | Wichgers et al. | 342/26 |

FOREIGN PATENT DOCUMENTS 0 955 557 A2   8/1998   (EP) .

OTHER PUBLICATIONS

Wahl F M; "DigitaleBildsignalversarbeitung"; Springer, Berling 1987; XP002154117; pp. 80–88, 92–104.

Chen C S et al; "Attenuation and Dispersing Compensation Via Capstral Processing"; IEEE Transactions on Acoustics, Speech and Signal Processing, Oct. 1981, USA vol. ASSP-29, No. 5, pp. 1080–1084, XP000960857: ISSN: 0096–3518.

(List continued on next page.)

Primary Examiner—Jayanti K. Patel
(74) Attorney, Agent, or Firm—Marsh Fischmann & Breyfogle LLP

(57) ABSTRACT

A system and method for detecting and/or classifying an obscured discrete cultural object and/or an obscured replicated object using image data from an optical, infrared or synthetic aperture radar imaging system is disclosed. Generally, the method and system of the present invention are directed to performing a cepstral analysis on the image data to attenuate the corruption signal in the image data and/or to enhance the discrete cultural object signal and/or the replicated object signature, and displaying an output of the cepstral analysis in the pixel and/or the spatial quefrency domain to detect and/or classify the discrete cultural object and/or the replicated object.

37 Claims, 11 Drawing Sheets

OTHER PUBLICATIONS

Cruthirds D et al.; "Processing of Synthetic Aperture Radar Images by the Boundary Contour System and Feature Contour System"; Proceedings of the International Joint Conference on Neural Networks; (IJCNN), US, New York, IEEE, vol. 7, Jun. 1992 (Jun. 7, 1992), pp. 414–419, XP0003465731 SN; 0–0783–0559–0; abstract; section 1, 4.

Arthor Unknown; "Image Processing Techniques"; Date Unknown; pp. 429–432.

Waslo, Bill, "Reflecting on Echoes and the Cepstrum: A look at Quefrency Alanysis and Hearing", Speaker Builder Magazine, Aug. 1994, pp. 1–10.*

Oppenheim, Alan V. and Lim, Jae S., "The Importance of Phase in Signals," May 1981, pp. 529–540.

Bogert, Bruce P., Healy, M. J.R., Tukey, John W.; "The Quefrency Analysis of Time Series for Echoes: Cepstrum, Pseudo–Autocovariance, Cross–Cepstrum and Saphe Cracking," from Proceedings of the Symposium on Time Series Analysis, Jun. 11–14, 1962; Chapter 15, pp. 209–243.

Gonzales, Rafael C., "Digital Image Processing," 1997, pp. 16–19.

* cited by examiner

Replicated Triangle Signal with $\sigma = 0.05$

Replicated Triangle Signal with $\sigma = 0.1$

Single Triangle Signal with $\sigma = 0.05$

CEPSTRAL METHOD AND SYSTEM FOR DETECTING/CLASSIFYING OBJECTS FROM AIR-BASED OR SPACE-BASED IMAGES

FIELD OF THE INVENTION

The present invention generally relates to a homomorphic method and system for detecting and/or classifying objects, and in particular, relates to a cepstral method and system for detecting and/or classifying obscured cultural objects and/or replicated objects using image data from passive and/or active imaging systems, such as optical, infrared or synthetic aperture radar imaging systems.

BACKGROUND OF THE INVENTION

Generally, for purposes of obtaining images of a particular area of interest from an air-based or space-based platform, optical (e.g., visible), infrared and synthetic aperture radar systems have been utilized. However, the capability of current optical, infrared and synthetic aperture radar systems to detect and/or classify obscured objects of interest is limited. For example, in instances where one or more cultural objects are obscured by cloud cover, use of images from current optical and infrared systems to detect and/or classify the obscured cultural object is extremely limited, if not impossible. Of course, in such instances where the cultural object of interest is covered by clouds, a synthetic aperture radar system may be utilized to image the area of interest. However, such synthetic aperture radar systems may not be readily available for use to image the particular area or cultural object of interest. In addition, in instances where the cultural object of interest is obscured by foliage (e.g., trees) or soil, a synthetic aperture radar system may not have the capability to provide a suitable image of the cultural object or objects of interest.

SUMMARY OF THE INVENTION

Accordingly, it is an object of the present invention to provide a method and system for utilizing an optical, infrared and/or synthetic aperture radar image to detect and/or classify one or more obscured objects.

It is a further object of the present invention to provide a homomorphic method and system for utilizing digital image data from an optical, infrared and/or synthetic aperture radar imaging system to detect and/or classify one or more obscured objects.

It is yet another object of the present invention to provide a cepstral method and system for processing image data from an optical, infrared and/or synthetic aperture radar system to attenuate corruption (e.g., due to clouds for optical and infrared images, and due to foliage or a thin layer of soil for synthetic aperture radar images) of one or more objects.

It is still another object of the present invention to provide a cepstral method and system for processing image data from a synthetic aperture radar system to amplify an obscured structure (e.g., a replicated structure comprising a plurality of cultural objects arranged in a pattern or an array), the structure being obscured by corruption, which can include noise from the imaging system, clutter, foliage (e.g., trees) or a thin layer of soil or water.

The present invention achieves one or more of these objectives by providing a method and system for detecting and/or classifying objects obscured by clutter (e.g., cloud cover) in optical and infrared imagery, and objects obscured by clutter (e.g., foliage or a thin layer of soil or water) in synthetic aperture radar imagery. Generally, the method and system of the present invention is directed to performing or conducting a homomorphic (e.g., cepstral) analysis on at least first image data corresponding to a first image from at least one of an optical, infrared and synthetic aperture radar ("SAR") imaging system and displaying an output of the homomorphic analysis in at least one of the spatial quefrency domain and the pixel domain to detect at least one of an obscured first cultural object (e.g., man-made structures or effects, such as buildings, air-based, sea-based or land-based vehicles, heat trails, such as plumes, or shadows attributable thereto, etc.) and an obscured first replicated object or structure (e.g., an array or pattern of objects, such as mines, etc.). More specifically, two-dimensional spatial image data (e.g., digital or, in some instances, analog) in the pixel domain comprising signals or signatures corresponding to at least the obscured first cultural object and/or the obscured first replicated object may be analyzed using a cepstral analysis to attenuate signals corresponding to corruption relative to the first cultural object signal and/or the first replicated object signature, and/or to enhance the first cultural object signal and/or the first replicated object signature. As a result, obscuration of at least the first cultural object and/or the first replicated object may be reduced or attenuated, such that the first cultural object and/or the first replicated object is detectable and/or classifiable.

Of importance, the method and system of the present invention is especially useful in low to very low signal-to-background ratio cases, with zero or lower decibels (dB) being not uncommon. It should be noted that this methodology for cloud cover attenuation in infrared imagery relies on the fact that cloud cover can be approximately modeled as a convolution of the cloud cover with the uncorrupted image. As such, the attenuation of cloud cover in infrared imagery is accomplished with the cepstral methodology described herein. In addition, any replicated signals will be amplified by virtue of this aspect of the cepstral methodology, which is not uncommon in cultural scenes.

In one aspect, the present invention is directed to a method for detecting and/or classifying at least a first cultural object using image data from one of an optical, infrared and SAR imaging system, the image data including at least signals corresponding to noise (e.g., system noise) and at least a first cultural object convolved with corruption. In one embodiment, the method includes the steps of processing the first image data from the pixel domain into the spatial quefrency domain, whereby the signals in the image data corresponding to at least the first cultural object and corruption correspond to separable cepstral coefficients in the spatial quefrency domain, processing in the spatial quefrency domain at least a first cepstral coefficient corresponding to the corruption signal to attenuate or reject at least a portion of the corruption signal, and processing at least a first cepstral coefficient corresponding to at least the first cultural object signal to obtain at least a portion thereof in the pixel domain, wherein at least a portion of the first cultural object is detectable in the spatial quefrency and/or pixel domain. Specifically, in order to deconvolve or separate signals corresponding to the first cultural object and corruption, the step of processing the first image data includes the steps of applying a two-dimensional Fourier transform (e.g., discrete or fast Fourier transform) to the first image data in the pixel domain to transform the first image data into a first discrete term in the spatial frequency domain, the first discrete term comprising a product of the spatial frequency of the first cultural object signal and the spatial frequency of the corruption signal in the spatial frequency domain, applying in the spatial frequency domain a complex logarithm to at least the first discrete term, the output of which comprises a discrete sum which includes a sum of the complex logarithms of the spatial frequencies of the first cultural object signal and the corruption signal, and applying an inverse two-dimensional Fourier transform to the discrete sum to transform the discrete sum into at least first cepstral coefficients corresponding to the first cultural object signal and the corruption signal in the spatial quefrency domain. In order to reject at least the portion of the corruption signal while retaining at least a portion of the first cultural object signal, the step of processing in the spatial quefrency domain at least a first cepstral coefficient corresponding to the corruption signal includes the step of modifying at least the first cepstral coefficient corresponding to the corruption signal. Optionally, the method may further include the step of mapping a least a first cepstral coefficient corresponding to the first cultural object signal to produce a displayable representation of the first cultural object in the spatial quefrency domain to thereby detect and/or classify the first cultural object. In order to enhance detectability of the first cultural object in the spatial quefrency domain, the method may also include the step of applying a gain factor greater than unity to the cepstral coefficients corresponding to the first cultural object signal to accentuate the first cultural object. Thereafter, at least the first cepstral coefficient corresponding to the first cultural object signal may be processed to obtain at least a portion thereof in the pixel domain. Specifically, processing of at least the first cepstral coefficient corresponding at least to the first cultural object signal into the pixel domain may include the steps of applying a two-dimensional Fourier transform to transform at least the first cepstral coefficient corresponding to at least the first cultural object signal in the spatial quefrency domain to a complex logarithm of the spatial frequency of at least the portion of the first cultural object signal, applying an inverse complex logarithm (e.g., complex exponential function) to the complex logarithm of the spatial frequency of at least the portion of the first cultural object signal, whereby the output of the inverse complex logarithm includes a spatial frequency of the portion of the first cultural object signal in the spatial frequency domain, and applying a two-dimensional inverse Fourier transform to transform at least the spatial frequency of at least the portion of the first cultural object signal into at least the portion of the first cultural object signal in the pixel domain. The method may further include the step of displaying at least the portion of the first cultural object to detect and/or classify the first cultural object, the corruption signal being attenuated.

In another aspect, method of the present invention is directed to detecting at least a first cultural object obscured by corruption using at least first image data from one of a first optical, first infrared and a first synthetic aperture radar image, whereby the first image data includes signals corresponding to noise (e.g., system noise) and at least the first cultural object convolved with corruption. Specifically, the method may include the steps of applying a two-dimensional Fourier transform (e.g., discrete or fast Fourier transform) to the first image data in the pixel domain to transform the first image data into a first discrete term in the spatial frequency domain, the first discrete term comprising a product of a spatial frequency of at least the first cultural object signal and a spatial frequency of the corruption signal in the spatial frequency domain, applying in the spatial frequency domain a complex logarithm to at least the first discrete term, the output of which comprises a discrete sum, the discrete sum including a sun of the complex logarithms of the spatial frequencies of the first cultural object signal and of the corruption signal, applying an inverse two-dimensional Fourier transform to the discrete sum to transform the discrete sum into cepstral coefficients corresponding to the first cultural object signal and the corruption signal in the spatial quefrency domain and, in order to reject the corruption signal while retaining at least the first cultural object signal, processing in the spatial quefrency domain at least the first cepstral coefficient corresponding to the corruption signal to attenuate the corruption signal. Optionally, the method may further include the step of mapping a least a first cepstral coefficient corresponding to the first cultural object signal to produce a displayable representation of the first cultural object in the spatial quefrency domain to thereby detect and/or classify the first cultural object. And, in order to enhance detectability of the first cultural object in the spatial quefrency domain, the method may also include the step of applying a gain factor greater than unity to the cepstral coefficients corresponding to the first cultural object signal to accentuate the first cultural object. Thereafter, the method may include the step of processing at least the first cepstral coefficient corresponding to at least the first cultural object signal to obtain at least a portion of the first cultural object signal corresponding to at least the first cultural object in the pixel domain in order to provide a displayable representation of at least a portion of the first cultural object in the pixel domain to detect and/or classify at least the first cultural object. Specifically, the processing step may include the steps of applying a two-dimensional Fourier transform to transform at least to the first cepstral coefficient corresponding to at least a portion of the first cultural object signal in the spatial quefrency domain to a complex logarithm of the spatial frequency of at least the portion of the first cultural object signal, applying an inverse complex logarithm (e.g., complex exponential function) to the complex logarithm of the spatial frequency of at least the portion of the first cultural object signal, the output of which comprises a spatial frequency of at least the portion of the first cultural object signal in the spatial frequency domain, and applying a two-dimensional inversion Fourier transform to transform at least the spatial frequency of at least a portion of the first cultural object signal into at least the portion of at least the enhanced first object signal in the pixel domain.

In yet another aspect of the present invention, a method for detecting at least a first replicated object using first image data from one of a first optical, first infrared and a first synthetic aperture radar image is disclosed. The first image data may include a first replicated object signature corresponding to the first replicated object, along with signals corresponding to corruption (e.g., foliage, soil, and water for SAR image data, and clouds for optical or infrared image data). Specifically, for purposes of detecting and/or classifying a first replicated object which may be obscured by corruption, the method includes the steps of processing the first image data from a pixel domain into the spatial quefrency domain to produce separable cepstral coefficients corresponding to at least a first amplification factor, the first replicated object signature and the corruption signal in the spatial quefrency domain, processing in the spatial quefrency domain at least a first cepstral coefficient corresponding to the corruption signal to attenuate the corruption signal and/or processing at least the first cepstral coefficients corresponding to at least the first replicated object signature and the first amplification factor to obtain at least an enhanced first replicated object signature corresponding to at least a portion of the first replicated object signature in the pixel domain, whereby at least a portion of the first replicated object is displayable. In this regard, at least a portion of the first replicated object in the pixel domain may be detected and/or classified due to attenuation of the corruption signal and/or enhancement of the first replicated object signature. In one embodiment, the step of processing the first image data from the pixel domain into the spatial quefrency domain includes the steps of applying a two-dimensional Fourier transform (e.g., discrete or fast Fourier transform) to the first image data in the pixel domain to transform the first image data into a first replicated term, which comprises a product of the first amplification factor and the spatial frequencies of the first replicated object signature and the corruption signal in the spatial frequency domain, applying in the spatial frequency domain a complex logarithm to the first replicated term, the output of which is a replicated sum comprising a sum of the complex logarithms of the first amplification factor and the spatial frequencies of the first replicated object signature and the corruption signal, and applying an inverse two-dimensional Fourier transform to the replicated sum to transform the replicated sum into at least first cepstral coefficients corresponding to the first replicated object signature, the first amplification factor and the corruption signal in the spatial quefrency domain. Advantageously, after the step of applying an inverse two-dimensional Fourier transform to the replicated sum, the method may further include mapping of at least the first cepstral coefficients corresponding to the first replicated signature and the first amplification factor in the spatial quefrency domain to produce at least a first displayable representation of the first cepstral coefficients corresponding to the first replicated signature and the first amplification factor to detect and/or classify at least the first replicated object. Such displayable representations may be displayed two-dimensionally (e.g., in the cepstrum). For purposes of rejecting at least the corruption signal while retaining the first replicated object signature and the first amplification factor, the step of processing in the spatial quefrency domain at least the first cepstral coefficient corresponding to the corruption signal includes the step of modifying in the spatial quefrency domain at least the first cepstral coefficient corresponding to the corruption signal to attenuate at least the corruption signal. For purposes of enhancing the first replicated object signature, the method may comprise the step of modifying in the spatial quefrency domain at least the first cepstral coefficients corresponding to the first replicated object signature and the first amplification factor to accentuate the first replicated object signature. The step of processing at least the first cepstral coefficients corresponding to the first replicated object signature and the first amplification factor include the steps of applying a two-dimensional Fourier transform to transform at least the first cepstral coefficients corresponding to at least the portion of the first replicated object signature and the first amplification factor in the spatial quefrency domain to a complex logarithm of the spatial frequency of the first amplification factor and at least the portion of the first replicated object signature, applying an inverse complex logarithm (e.g. a complex exponential function) to the complex logarithms of the spatial frequency of at least the portion of the replicated object signature and the first amplification factor, the output of which comprises a spatial frequency of at least the portion of the first replicated object signature and the first amplification factor in the spatial frequency domain, and applying a two-dimensional inverse Fourier transform to transform at least the spatial frequency at least the portion of the first replicated object signature and the first amplification factor into at least a portion of the replicated object signature in the pixel domain. At least the portion of the first replicated object may be thereafter displayed in the pixel domain to detect and/or classify the first replicated object. Advantageously, this embodiment of the method of the present invention allows at least the first replicated object and/or a first representation corresponding thereto to be displayed in the pixel domain and/or the spatial quefrency domain to detect and/or classify at least the first replicated object.

In yet another aspect, the present invention is directed to a method for detecting at least a first replicated object using at least the first image data from one of a first optical, a first infrared, and a first synthetic aperture radar image, the first replicated object comprising a plurality of objects arranged in a pattern, and the first image data including signals corresponding to noise and corruption (e.g., foliage or a thin layer of soil or water for SAR image data, or clouds for optical or infrared image data) and at least a first replicated object signature corresponding to at least the first replicated object. Generally, the method includes the steps of applying a two-dimensional Fourier transform (e.g., discrete or fast Fourier transform) to the first image data in a pixel domain to transform the first image data into a first replicated term, which comprises a product of a first amplification factor and the spatial frequencies of at least the first replicated object signature and the corruption signal in the spatial frequency domain, applying in the spatial frequency domain a complex logarithm to the first replicated term, the output of which is a first replicated sum comprising a sum of the complex logarithms of the first amplification factor and the spatial frequencies of the first replicated object signature and the corruption signal, and applying an inverse two-dimensional Fourier transform to the first replicated sum to transform the first replicated sum into cepstral coefficients corresponding to the first replicated object signature, the first amplification factor and the corruption signal in a spatial quefrency domain. Of importance, the first replicated object is detectable in the spatial quefrency domain. More specifically, in one embodiment, the method may further comprise a step of mapping at least the first cepstral coefficients corresponding to the first replicated object signature and the first amplification factor in the spatial quefrency domain to produce at least a first displayable representation of at least one of the first cepstral coefficients corresponding to the first replicated object signature and the first amplification factor in the spatial quefrency domain. The method may further include the step of displaying two-dimensionally (e.g, in the cepstrum) at least the first displayable representation of at least one of the first cepstral coefficients to facilitate attenuation of the corruption signal and/or enhancement of the first replicated object signature. Also, for purposes of facilitating exploitation of the first image data in the pixel domain, the method may include the steps of processing in the spatial quefrency domain at least a first cepstral coefficient corresponding to the corruption signal to attenuate at least the corruption signal, and processing at least first cepstral coefficients corresponding to at least the first replicated object signature and the first amplification factor to obtain an enhanced first replicated object signature corresponding to at least a portion of the first replicated object in the pixel domain, whereby at least a portion of the enhanced first replicated object is displayable. More specifically, the step of processing in the spatial quefrency domain at least the first cepstral coefficient corresponding to the corruption signal may include the step of modifying at least the first cepstral coefficient corresponding to the corresponding to the corruption signal to reject at least a portion of the corruption signal. thereafter, the method may further include the step of processing at least the cepstral coefficients corresponding to at least the first replicated object and the first amplification factor from the spatial quefrency domain into the pixel domain. Specifically, the processing step may include the steps of applying a two-dimensional Fourier transform to transform at least to the first cepstral coefficients corresponding to at least a portion of the enhanced first replicated object signature and the first amplification factor in the spatial quefrency domain to a complex logarithm of the spatial frequency of at least the portion of the enhanced first replicated object signature and the first amplification factor, applying an inverse complex logarithm (e.g., complex exponential function) to the complex logarithm of the spatial frequency of at least the portion of the enhanced first replicated object signature and the first amplification factor, the output of which comprises a spatial frequency of at least the portion of the enhanced first replicated object signature and the first amplification factor in the spatial frequency domain, and applying a two-dimensional inversion Fourier transform to transform at least the spatial frequency of at least a portion of the first enhanced replicated object signature and the first amplification factor into at least the portion of at least the enhanced first replicated object signature in the pixel domain. In one embodiment, after the step of applying the two-dimensional inverse Fourier transform to transform at least the spatial frequency of at least the portion of the first replicated object signature and the first amplification factor into at least the portion of the enhanced first replicated object signature in the pixel domain, the method may further comprise the step of displaying at least the portion of the enhanced first replicated object corresponding to at least the portion of the enhanced first replicated object signature in the pixel domain.

In still another aspect, the present invention relates to a system for detecting at least one of a first cultural object and a first replicated object using at least first image data from one of a first optical, a first infrared and a first synthetic aperture radar image, the first replicated object including a plurality of objects arranged in a pattern, and the first image data in the pixel domain including signals corresponding to noise and corruption (e.g., clouds for optical and infrared image data, and foliage or a thin layer of soil or water for SAR image data) and at least one of a first cultural object signal corresponding to the first cultural object and a first replicated object signature corresponding to at least the first replicated object. Generally, the system includes a means for performing a cepstral analysis on at least the first image data to at least attenuate the corruption signal and/or enhance at least the first replicated object signature, and a means for displaying an output of the means for performing the cepstral analysis in the pixel domain and/or the spatial quefrency domain to detect the first cultural object and/or the first replicated object. In one embodiment, the means for performing the cepstral analysis includes a means for processing the first image data from a pixel domain into the spatial quefrency to obtain from the first image data separable cepstral coefficients corresponding to the first cultural object and corruption signals in the spatial quefrency domain and/or the first replicated object signature, a first amplification factor and the corruption signal in the spatial quefrency domain. Specifically, the means for processing the first image data from the pixel domain into the spatial quefrency domain may include a means for taking a two-dimensional Fourier transform of the first image data in the pixel domain to transform the first image data into a first discrete term and/or a first replicated term, the first discrete term including a product of spatial frequencies of the first cultural object signal and the corruption signal in the spatial frequency domain, the first replicated term including a product of the first amplification factor and the spatial frequencies of the first replicated object signature and the corruption signal, a means for taking a complex logarithm in the spatial frequency domain of at least the first discrete term and/or the first replicated term to obtain a first discrete sum and/or a first replicated sum, respectively, the first discrete sum including a sum of the complex logarithms of the spatial frequencies of the first cultural object and the corruption signals, the first replicated sum including a sum of the complex logarithms of the first amplification factor and the spatial frequencies of the first replicated object signature and the corruption signal, and a means for taking an inverse two-dimensional Fourier transform of the first discrete sum and/or the first replicated sum to transform the first discrete sum and/or the first replicated sum into cepstral coefficients corresponding to the first cultural object signal and the corruption signal and/or the first replicated object signature, the first amplification factor and the corruption signal in the spatial quefrency domain, respectively. In order to detect the first replicated object in the spatial quefrency domain, the system may include a means for mapping displayable representations of first cepstral coefficients corresponding to the first replicated object signature and the first amplification factor.

In order to reject at least a portion of the corruption signal while retaining the first cultural object signal and/or the first replicated object signature, the means for performing the cepstral analysis may further include a means for processing, in the spatial quefrency domain, at least a first cepstral coefficient corresponding to the corruption signal to attenuate the corruption signal. In one embodiment, the means for processing at least the first cepstral coefficient corresponding to the corruption signal includes a means for modifying at least the first cepstral coefficient corresponding to the corruption signal. The means for performing the cepstral analysis may further include a means for modifying a first cepstral coefficient corresponding to the first cultural object and/or the first replicated object signature and the first amplification factor to enhance or accentuate the first cultural object signal and/or the first replicated object signature, respectively.

In another embodiment, where detection of the first cultural object and/or the first replicated object is desired in the pixel domain, the means for performing the cepstral analysis may further include a means for processing at least a first of the cepstral coefficients corresponding to the first cultural object signal and/or the first replicated object signature in the first amplification factor to obtain at least a portion of the first cultural object signal and/or an enhanced first replicated object signature in the pixel domain. Specifically, in one embodiment, the means for performing the cepstral analysis includes a means for taking a two-dimensional Fourier transform to transform the first cepstral coefficients corresponding to at least the portion of the first cultural object signal and/or at least the portion of the first replicated object signature in the first amplification factor in the spatial quefrency domain to a complex logarithm of the spatial frequencies of at least the portion the first cultural object signal and/or at least the portion of the first replicated object signature and the first amplification factor, a means for taking, in the spatial frequency domain, an inverse complex logarithm (e.g., complex exponential function) to the complex logarithm of the spatial frequencies of at least the portion of the first cultural object signal and/or at least the portion of the first replicated object signature and the first amplification factor, the output of which includes the spatial frequencies of at least the portions of the first cultural object signal and/or at least the portions of the first replicated object signature and the first amplification factor, and a means for taking a two-dimensional inverse Fourier transform to transform the spatial frequencies of at least the portion the first cultural object signal and/or at least the portion of the first replicated object signature and the first amplification factor into at least the portion of the first cultural object signal and/or at least the portion of an enhanced first replicated object signature in the pixel domain.

DETAILED DESCRIPTION OF THE INVENTION

FIGS. 1–11 illustrate the various features of the method and system of the present invention. Generally, the method and system of the present invention are directed to processing image data relating to images collected by an optical imaging system (e.g., real image data), an infrared imaging system (e.g., real image data) and/or a synthetic aperture radar imaging system (e.g., real or complex image data) to detect and/or classify a cultural object and/or a replicated object. The method and system of the present invention are especially useful for detecting and/or classifying such cultural and replicated objects that are hidden by stochastic obscuration. For example, a method and system of the present invention may be used to detect and/or classify cultural and/or replicated objects obscured by cloud cover in optical or infrared imagery and/or to detect and/or classify cultural and/or replicated objects obscured by tree foliage or a thin layer of soil or water in synthetic aperture radar imagery. In this regard, the cepstral method and system of the present invention are particularly useful for low to very low signal-to-background ratio cases, with zero or lower decibel (dB) not being uncommon.

Generally, the method and system described herein involves the processing of some given image data, real or complex, where a large amount of stochastic corruption prevents signals of interest, both discrete and signals which are comprised of a replicated signature, from being readily evident to users of the image data. More specifically, the method of the present invention is directed to processing image data (e.g., digital or analog) from an optical, infrared and/or synthetic aperture radar imaging system to detect and/or classify a cultural object and/or a replicated object which is obscured. In this regard, the objective of the method is to separate desirable signals or data (e.g., a signal from a cultural object, a signature of a replicated object) in a first image data from undesirable signals or data (e.g., corruption signals corresponding to obscuration) in the first image data, and to retain the desirable signals while rejecting the undesirable signals. As such, the method of the present invention functions to process the first image data to attenuate the corruption signals within the first image data and/or to enhance the replicated object signature in the first image data, if any.

Figure 1:
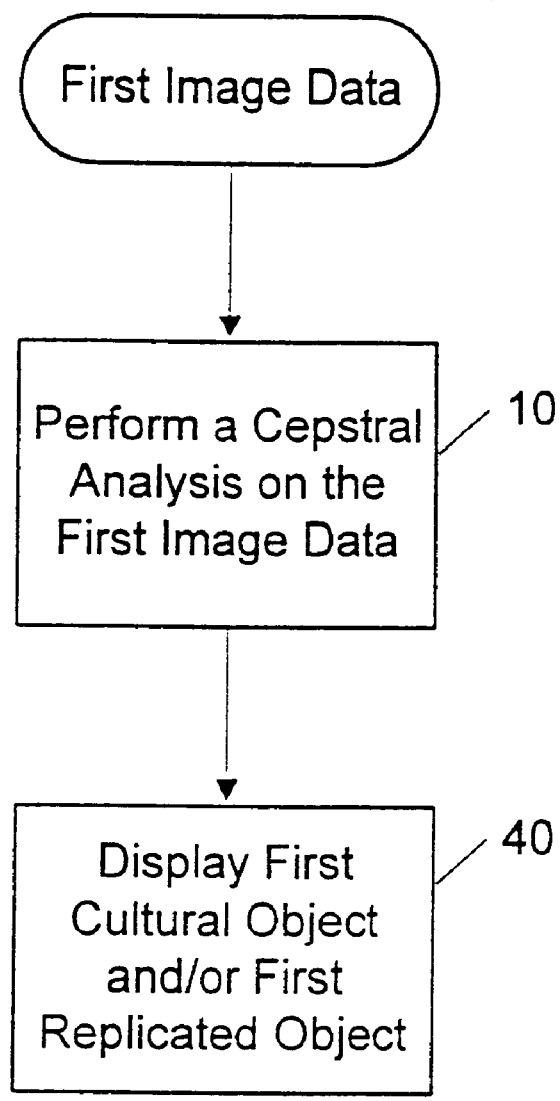
FIG. 1 is a flow chart illustrating one embodiment of the method of the present invention.
Figure 2:
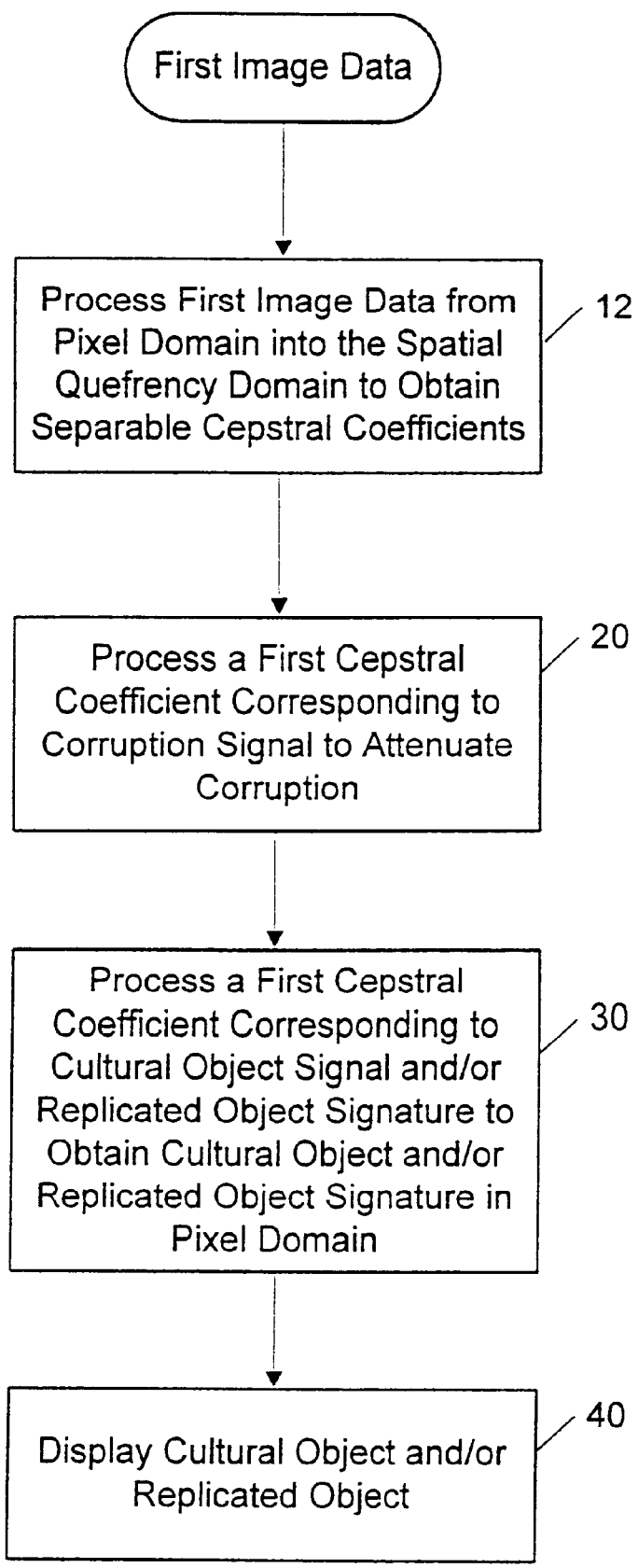
FIG. 2 is a flow chart illustrating another embodiment of the method of the present invention.

Referring to FIG. 1, the method of the present invention generally includes the step of performing (10) a cepstral analysis on the first image data to attenuate or reject at least a portion of the corruption signal in the first image data and/or to enhance the first replicated object signature and the step of displaying (40) at least a first cultural object and/or a first replicated object in the pixel domain and/or the spatial quefrency domain to detect and/or classify the same. More specifically, and referring to FIG. 2, one embodiment of the method of the present invention is directed to processing image data to detect and/or classify at least one cultural object, the image data obtained from an optical, and infrared and/or a synthetic aperture radar imaging system and including signals corresponding to at least a first cultural object and/or a first replicated object convolved with corruption. In this embodiment of the method of the present invention, the method includes the step of processing (12) the first image data from the pixel domain into the spatial quefrency domain in order to obtain separable cepstral coefficients which correspond to at least portions of the corruption signal, the cultural object signal and/or the replicated object signature. For purposes of rejecting the corruption signal while retaining the cultural object signal and/or the replicated object signature, the method further includes the step of processing (20) at least a first cepstral coefficient corresponding to the corruption signal to attenuate at least a portion of the corruption signal. Finally, the method further includes the step of processing (30) at least a first cepstral coefficient corresponding to the cultural object signal and/or the replicated object signature to obtain at least a portion of the cultural object signal and/or at least a portion of the replicated object signature in the pixel domain, and the step of displaying (40) at least a portion of the cultural object and/or the replicated object corresponding to at least the portion of the cultural object signal and/or at least the portion of the replicated object signature in the pixel domain to detect and/or classify the same.

Figure 3:
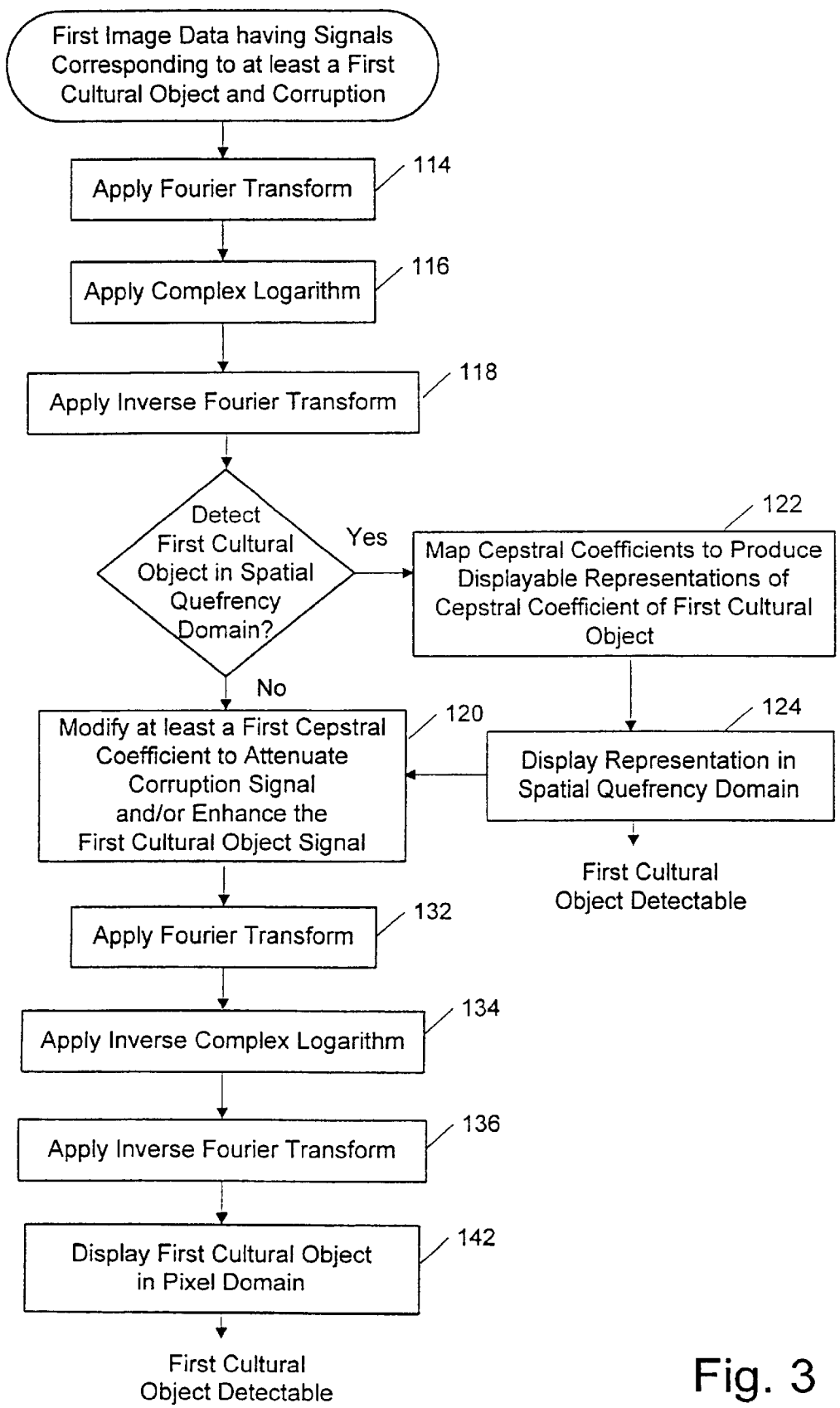
FIG. 3 is a flow chart illustrating yet another embodiment of the method of the present invention.

In one embodiment of the method of the present invention, illustrated in FIG. 3, the first image data "$a(x, y)$" includes a first cultural object signal corresponding to a first cultural object convolved with a corruption signal corresponding to an obscuration:

$$a(x, y) = d(x, y) ** c(x, y) + w(x, y),$$

where $x, y = 0, 1, \ldots N-1$ where "$c(x, y)$" corresponds to corruption, "$w(x, y)$" corresponds to noise (e.g., system noise), and "$d(x, y)$" corresponds to the true image, where:

$$d(x, Y) = \Sigma \gamma_k r(x-x_k, Y-Y_k) + g(x, y)$$

where "γ" is a scale factor, "k" corresponds to the number of repeated signals, "$r(x-x_k, Y-Y_k)$" corresponds to a replicated object and "g(x, y)" corresponds to a cultural structure or object.

The method includes the steps of applying (114) a two-dimensional Fourier transform (e.g., fast Fourier transform, discrete Fourier transform) to the first image data "a(x, y)" which is in the pixel domain to transform the first image data "a(x, y)" into at least a first discrete term "A(u, v)" in the spatial frequency domain. A graphic representation of applying the Fourier transform is provided hereinbelow:

$$F[a+j0] \rightarrow A,$$

wherein "A", per the two-dimensional Fourier convolution and shift theorems:

$$A(u, v)=D(u, v)C(u, v)+W(u, v),$$

where $D(u, v)=R(u, v)H(u, v)+G(u, v)$, and $$H(u, v)=\Sigma\gamma_k \exp\{-2\pi j[ux_k+vy_k]/K\},$$

whereby "H(u, v)" corresponds to an amplification factor, "R(u, v)" corresponds to the replicated object signature, "G(u, v)" corresponds to the cultural object, "C(u, v)" corresponds to the corruption signal, and "W(u, v)" corresponds to system noise in the spatial frequency domain. The index "k" runs from zero (0) to K.

In this embodiment, where the first image data "a(x, y)" includes only a cultural object and not a replicated object, the first discrete term "A(u, v)" corresponds to a product of the spatial frequency of the first cultural object signal "G(u, v)" and the spatial frequency of the corruption signal "C(u, v)", First Discrete Term "A(u, v)"≅G(u, v) C(u, v).

In this regard, stochastic corruption in the first image data which is in the form of a convolution with the cultural object signals in the first image data becomes a product in the spatial frequency domain of the first cultural object signal times the stochastic corruption factor. In instances where the first image data could also include a replicated object signature, "r(x, y)", such that a first replicated term is produced by applying the two-dimensional Fourier transform, First Replicated Term "A(u, v)"≅R(u, v) H(u, v) C(u, v), the method further includes the step of filtering (e.g., linear filtering) the output of the Fourier transform to pass only the first discrete term or the replicated term. In this regard, in instances where the first image data may contain a replicated object signature, but only the cultural object is of interest, a linear filter may be used to pass only the first discrete term corresponding to a product of the spatial frequency of the first cultural object signal "G(u, v)" and the spatial frequency of the corruption signal "C(u, v)".

In the embodiment illustrated in FIG. 3 the method further includes the step of applying (116) in the spatial frequency domain a complex logarithm to the first discrete term "A(u, v)", the output of which is a discrete sum "CLOG (A(u, v))" comprising a sum of the complex logarithms of the spatial frequencies of the first cultural object signal and the corruption signal:

First Discrete Sum "CLOG (A(u, v))"=CLOG(G(u, v) C(u, v))≅CLOG (G(u, v))+CLOG(C(u, v))+2πjN(G(u, v), C(u, v)), where "CLOG" is a Complex Logarithm, and N() is 0,±1.

The object of the step of applying (116) the complex logarithm is to take advantage of the property that the logarithm of a product is equal to the sum of the logarithms of the individual factors of the product, plus a phase term $(2\pi j) \times$(integer), where $j^2=-1$, where the integer is ±1 or 0. As such, each factor of interest (e.g., cultural object signal, corruption signal), either for retention or rejection, is represented as a term in a sum and can thus be operated upon by well-established linear methods of signal processing, which are discussed hereinbelow. In this regard, this embodiment of the method of the present invention further includes the step of applying (118) an inverse Fourier transform to the discrete sum to transform the discrete sum into cepstral coefficients corresponding to the cultural object signal and the corruption signal in the spatial quefrency domain:

$$F^{-1}[\text{First Discrete Sum "CLOG }(A(u, v))\text{"}]=F^{-1}[\text{CLOG }(G(u, v))+\text{CLOG }(C(u, v))]=F^{-1}[\text{CLOG }(G(u, v))]+F^{-1}[\text{CLOG }(C(u, v))]$$

For purposes of rejecting at least a portion of the stochastic corruption of the first image data while retaining the image data corresponding to the cultural object signal, the method further includes the step of modifying (120) in the spatial quefrency domain at least a first cepstral coefficient corresponding to the corruption signal to attenuate at least a portion of the corruption signal. Additionally, the method may optionally include the step of modifying (120) in the spatial quefrency domain at least a first cepstral coefficient corresponding to the first cultural object signal to enhance the first cultural object signal by applying a gain greater than unity.

Figure 4:
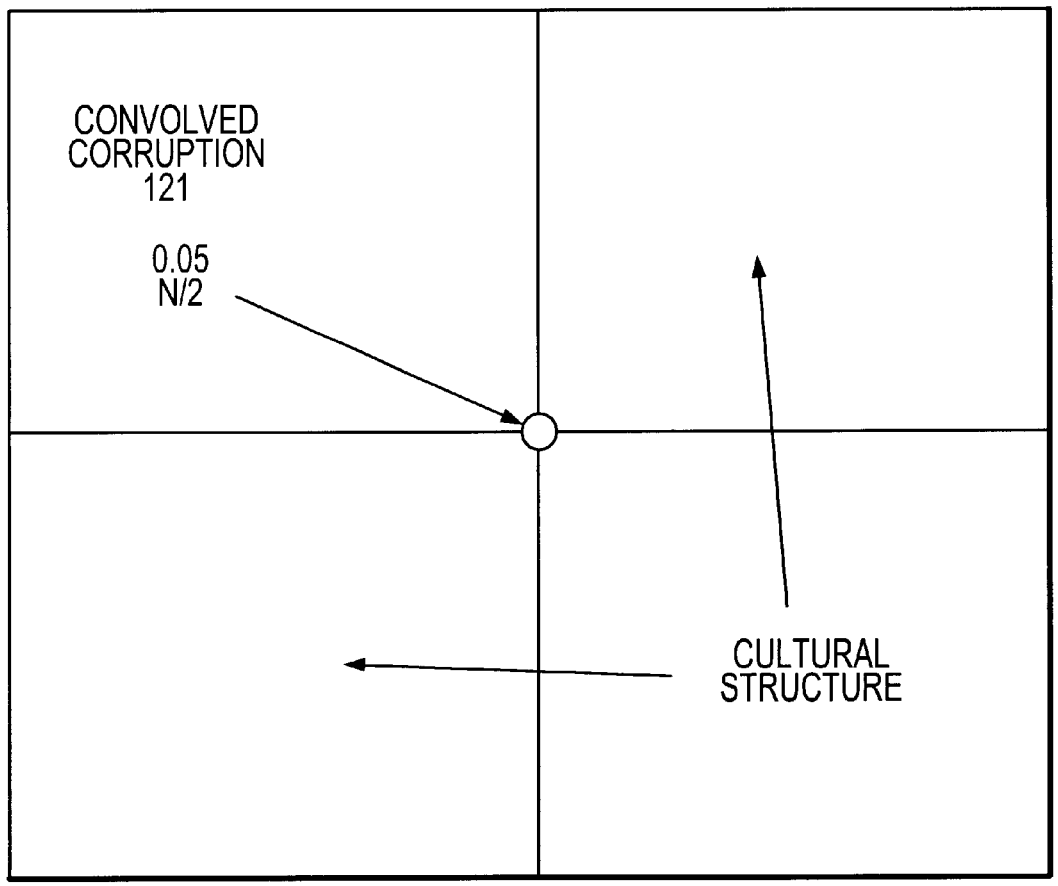
FIG. 4 illustrates a two-dimensional cepstrum with corruption energy concentrated in the center thereof.

Referring to FIG. 4, the method may include the step of mapping (122) the cepstral coefficients to provide the human analyst with a visual means of inspecting the structure of the cepstrum. Mapping is required to fit the cepstral coefficients, which typically range over several orders of magnitude, into a range from zero (0) to two-hundred fifty-five (255) for digital display. This can be done by the standard linear mapping from the minimum and maximum of the cepstral coefficients to the range 0–255. Alternatively, the cepstral coefficient mean, standard deviation can be matched to values in the 0–255 range (e.g., 64 and 32). For imagery with corruption energy convolved in the pixel domain, the corresponding energy in the spatial quefrency domain is concentrated in the center of the two dimensional cepstrum with the cultural structure of the image somewhat removed therefrom, as illustrated in FIG. 4 for an "N×N" input pixel image. The black circle (121) containing the convolved corruption may be zeroed out to attenuate the corruption signal. And, since a discrete cultural object (e.g., first cultural object) is not typically distinguishable in the cepstrum, the method may also include the step of modifying (120) in the spatial quefrency domain the cepstral coefficients corresponding to the first cultural object to enhance or boost the first cultural object signal by applying a gain greater than unity before the step of applying (132) a two-dimensional Fourier transform (which will be described in more detail hereinbelow). As such, the method may further include the step of displaying (124) a representation corresponding to the first cultural object signal in the spatial quefrency domain to detect and/or classify the first cultural object. It should be noted that in the cepstrum, a cultural structure, such as the first cultural object, would be typically located off-center, in one of the quadrants of the cepstrum.

Referring to FIG. 3, for purposes of returning the first image data back to the pixel domain for viewing by a user, the method further includes the step of applying (132) a two-dimensional Fourier transform to transform at least the first cepstral coefficient corresponding to at least a portion of the cultural object signal in the spatial quefrency domain to a complex logarithm of the spatial frequency of at least the portion of the first cultural object signal. In this regard, the applying (132) step reverses the applying (118) inverse Fourier transform step described hereinabove. The method further includes the step of applying (134) an inverse complex logarithm (e.g., a complex exponential function) to the complex logarithm of the spatial frequency of at least a portion of the cultural object signal, the output of which is a spatial frequency of at least the portion of the cultural object signal in the spatial frequency domain. In this regard, the applying (134) inverse complex logarithm step reverses the applying (116) complex logarithm step described hereinabove. In order to return the image data to the pixel domain for viewing by a viewer, the method also includes applying (136) an inverse Fourier transform to transform the spatial frequency of at least the portion of the cultural object signal into at least the portion of the cultural object signal in the pixel domain. This applying step (136) effectively reverses the step of applying (114) the Fourier transform described hereinabove. Thereafter, the method comprises the step of displaying (142) at least the portion of the cultural object in the pixel domain for detection and/or classification of at least the cultural object.

Figure 5:
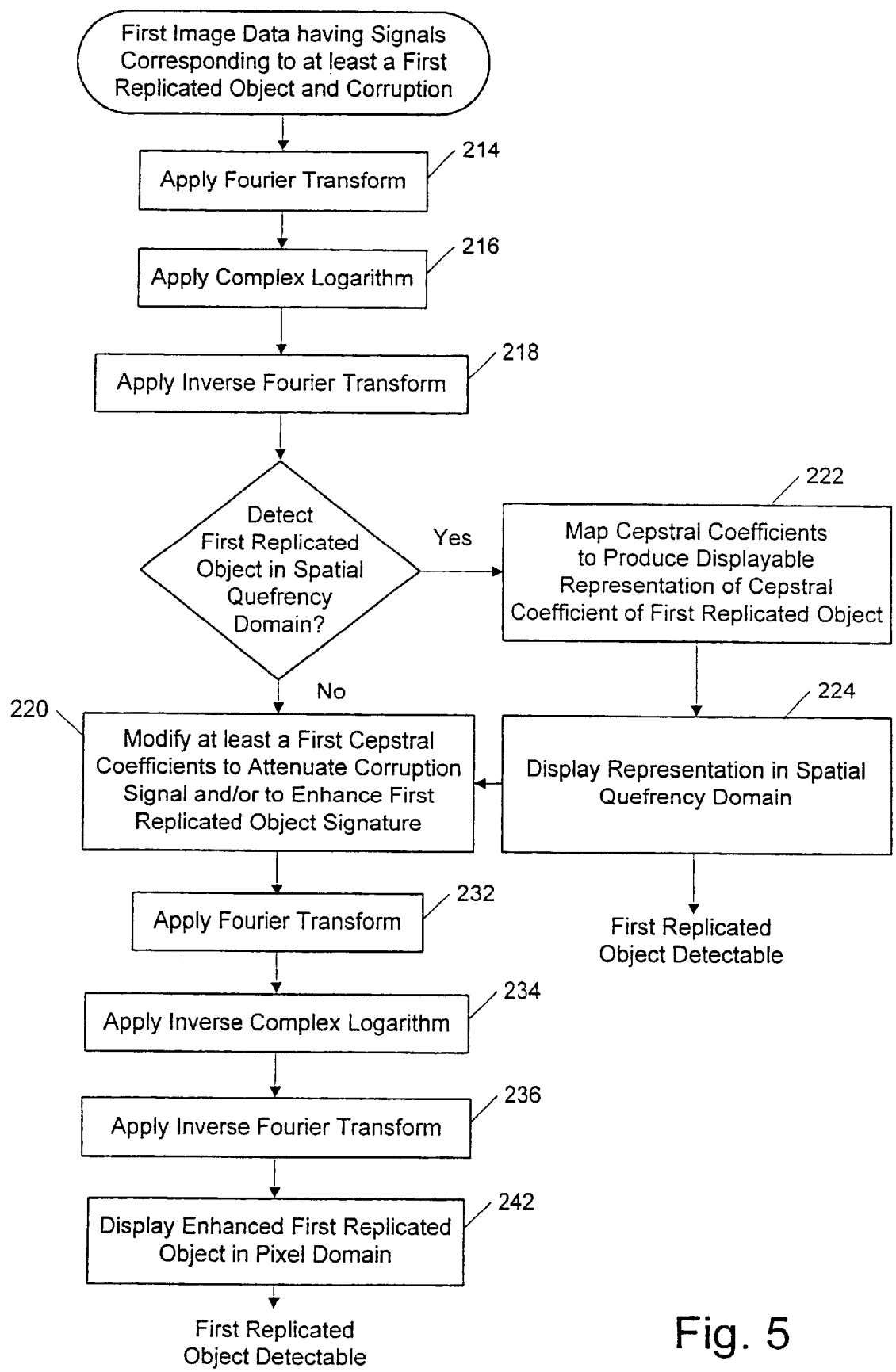
FIG. 5 is a flow chart illustrating another embodiment of the method of the present invention.

In another embodiment, illustrated in FIG. 5, the method of the present invention is directed to processing image data, real or complex, where the image data has a large amount of stochastic corruption which prevents the signals of interest, namely, signals which are comprised of a replicated signature from a replicated object, from being readily evident to users or viewers of the image data. Referring to FIG. 5, initially, in instances where it is believed that the first image data "a(x, y)" from an optical, infrared or synthetic aperture radar imaging system includes a replicated object (e.g., an array of mines), such that:

$$a(x, y) = d(x, y) ** c(x, y) + w(x, y),$$

where x, y = 0, 1, ..., N−1
where "c(x, y)" corresponds to a corruption, "w(x, y)" corresponds to noise (e.g., system noise), and "d(x, y)" corresponds to the true image:

$$d(x, y) = \Sigma \gamma_k r(x-x_k, y-y)_k + g(x, y),$$

where "$\gamma$" is a scale factor, "k" corresponds to the number of repeating signals, "$r(x-x_k, Y-Y_k)$" corresponds to a replicated object and "g(x, y)" corresponds to a cultural structure or object.

In this regard, the first image data "a(x, y)" includes signals corresponding to corruption "c(x, y)" and a replicated object signature "$r(x-x_k, Y-Y_k)$" corresponding to a replicated object. For purposes of processing the image data "a(x, y)" from the pixel domain into the spatial quefrency domain to produce separable cepstral coefficients corresponding to at least a portion of the replicated object signature, an amplification factor and the corruption signal in the spatial quefrency domain, the method includes the steps of applying (214) a two-dimensional Fourier transform to the first image data "a(x, y)" in the pixel domain to transform the first image data into at least a first replicated term "A(u, v)" comprising a product of an amplification factor "H(u, v)" and the spatial frequencies of at least a portion of the first replicated object signature "R(u, v)" and the corruption signal "C(u, v)":

$$F[a+j0] \rightarrow A,$$

wherein "A", per the two-dimensional Fourier convolution and shift theorems:

$$A(u, v) = D(u, v) C(u, v) + W(u, v),$$

where $D(u, v) = R(u, v)(u, v) + G(u, v)$, and $$H(u, v) = \Sigma \gamma_k \exp\{-2\pi j[ux_k + vy_k]/K\},$$

whereby "H(u, v)" corresponds to an amplification factor, "R(u, v)" corresponds to the replicated object signature, "G(u, v)" corresponds to the cultural object, "C(u, v)" corresponds to the corruption signal, and "W(u, v)" corresponds to system noise in the spatial frequency domain. The index "k" runs from zero (0) to K.

Since the image data in the spatial frequency domain "A(u, v)" is represented as a sum, the step of processing of the image data from the pixel domain into the spatial quefrency domain further includes the step of filtering (e.g., linearly filtering) the image data in the spatial frequency domain to pass only the replicated term (e.g., if the image data may contain signals corresponding to a discrete cultural object), whereby, First Replicated Term "$A(u, v)" \cong R(u, v) H(u, v) C(u, v)$. The step of processing the image data from the pixel domain into the spatial quefrency domain further includes the step of applying (216) in the spatial frequency domain a complex logarithm to the replicated term, the output of which is a replicated sum "CLOG (A(u, v))" comprising the complex logarithm of the amplification factor "H(u, v)" plus the complex logarithms of the spatial frequencies of the replicated object signature "R(u, v)" and the corruption signal "C(u, v)":

First Replicated Sum "CLOG $A(u, v)$" = CLOG($R(u, v) H(u, v) C(u, v))\cong$CLOG $(R(u, v))+$CLOG $(H(u, v))+$CLOG $(C(u, v))+ 2\pi j$ N($R(u, v), H(u, v), C(u, v)$), where "CLOG" is a Complex Logarithm, and N( ) is 0,±1. The object of the step of applying (216) the complex logarithm to the replicated term is to take advantage of the property that the logarithm of a product is equal to the sum of the logarithm of the individual factors of the product plus a phase term $(2\pi j) \times$(integer), where $j^2 \times -1$ and the integer is ±1 or 0. The step of processing the image data from the pixel domain into the spatial quefrency domain further includes the step of applying (218) an inverse two-dimensional Fourier transform to the replicated sum "CLOG (A(u, v)":

$F^{-1}$[First Replicated Sum "CLOG $(A(u, v)$"]=$F^{-1}$[CLOG $(R(u, v))+$CLOG $(H(u, v))+$CLOG $(C(u, v))+2\pi j$N($R(u, v), H(u, v), C(u, v))$]=$F^{-1}$[CLOG $(R(u, v))$]+$F^{-1}$[CLOG $(H(u, v))$]+$F^{-1}$ [CLOG $(C(u, v))$]

to transform the replicated sum into cepstral coefficients which correspond to at least the portion of the replicated object signature, the amplification factor and the corruption signal in the spatial quefrency domain. In this domain, the inverse Fourier transformed image data corresponding to the complex log of the stochastic corruption signal "$F^{-1}$[CLOG (C(u, v))]" can be effectively zeroed out to reject the stochastic corruption of the input image data while retaining the inverse Fourier transformed image data corresponding to the complex log of the replicated object signature and the amplification factor "$F^{-1}$[CLOG (R(u, v))]+$F^{-1}$[CLOG (H(u, v))]." In this regard, the method further comprises the step of processing in the spatial quefrency domain at least a first cepstral coefficients corresponding to the corruption signal to attenuate at least a portion of the corruption signal, such that at least the portion of the first replicated object signature remains. In one embodiment, the step of processing a first cepstral coefficient corresponding to the corruption signal includes the step of modifying (220) at least the first cepstral coefficient corresponding to the corruption signal in the cepstral quefrency domain to attenuate at least the portion of the corruption signal.

Figure 6A:
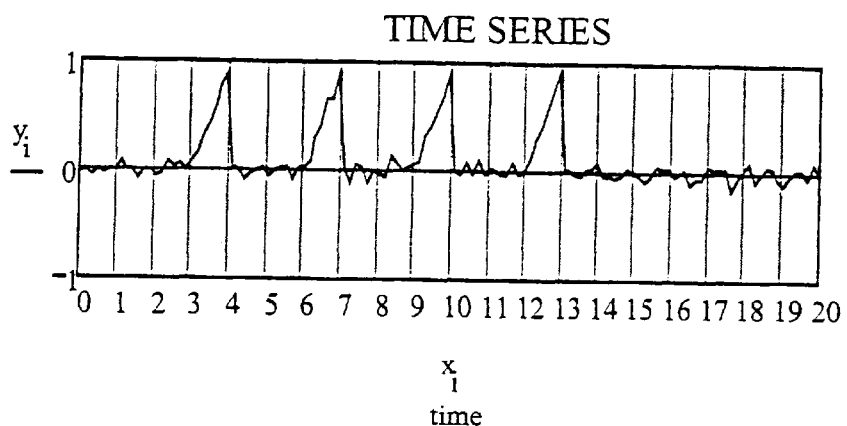
FIGS. 6A–6B is a plot of a quadruple triangle signal in a time series domain and in the cepstrum.
Figure 6B:
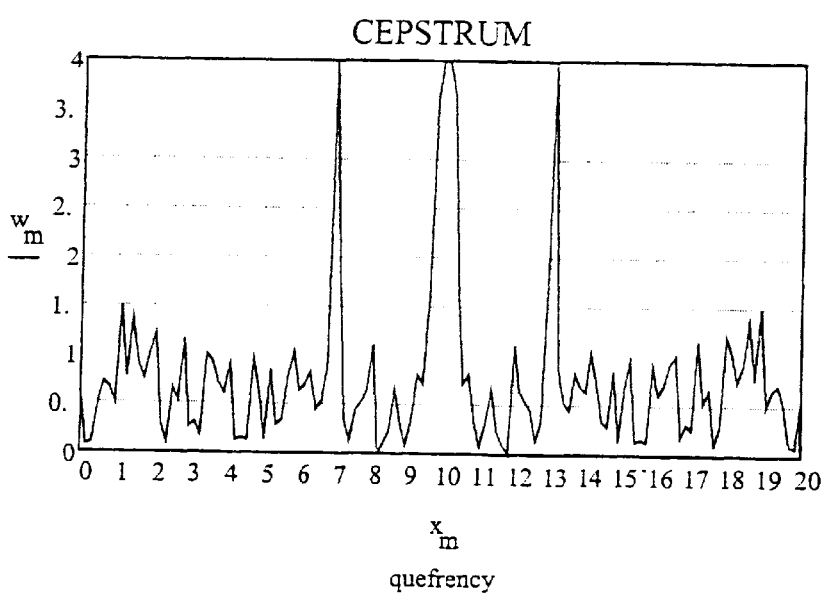
Figure 7A:
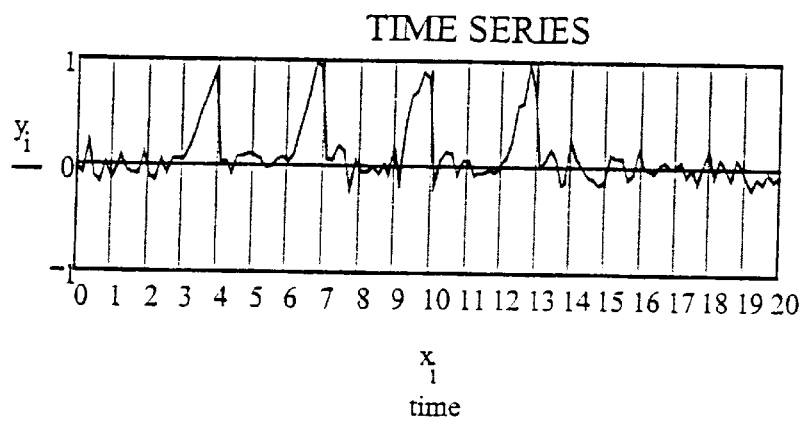
FIGS. 7A–7B is a plot of a quadruple triangle signal in the time series domain and in the cepstrum.
Figure 7B:
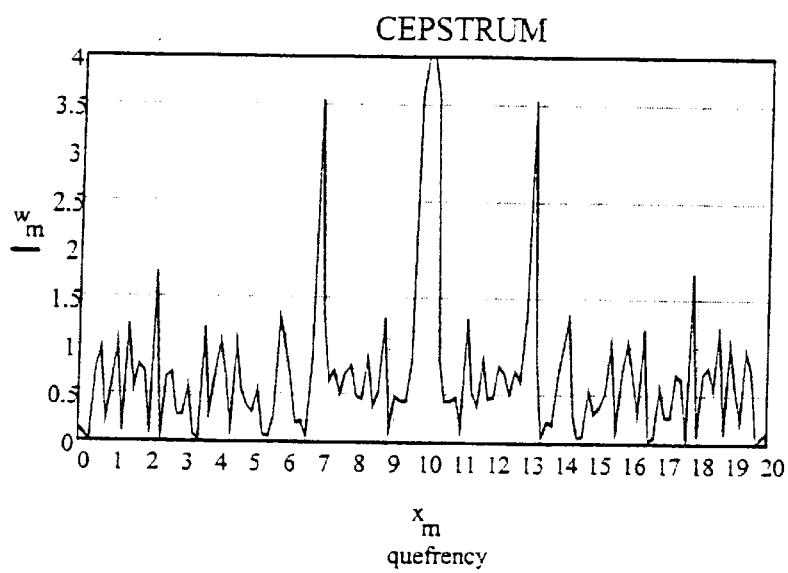
Figure 8A:
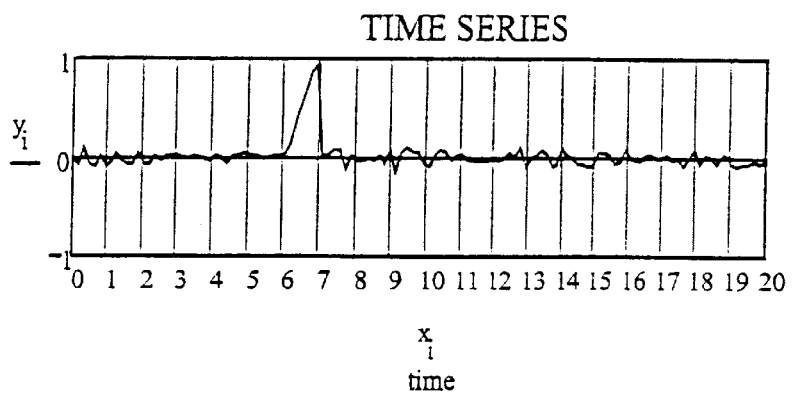
FIGS. 8A–8B is a plot of a single triangle signal in the time series domain and the cepstrum.
Figure 8B:
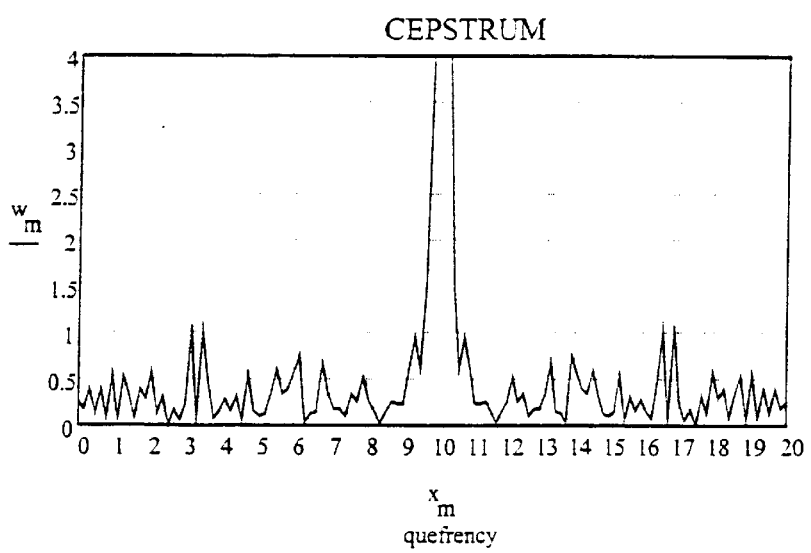

More specifically, if it is desirable to attenuate at least a portion of the corruption signal and/or enhance the replicated object signature in the spatial quefrency domain, after the step of applying (218) the inverse two-dimensional Fourier transform to the replicated sum, the method includes the step of modifying (220) the cepstral coefficients corresponding to the corruption signal and/or the replicated object signature and the amplification factor in the spatial quefrency domain. By way of example, the cepstral coefficients can be shown one-dimensionally (e.g., akin to a time series domain to illustrate the behavior of the replicated object signature which manifests itself as spikes in this domain) two-dimensionally (e.g., in the cepstrum domain), as illustrated in FIGS. 6A–6B, 7A–7B, and 8A–8B. Referring to FIG. 6A, cepstral coefficients of interest (e.g., corresponding to the replicated object signature, corruptions signal) may be identified in a simple time series domain. As seen in FIG. 6A, the image data corresponds to a triangle-shaped signal replicated four times. FIG. 6B illustrates the cepstrum thereof, with Gaussian white noise added having a mean of zero and a standard deviation of 0.05. The spacing between the triangle signal models is three units of time. As such, the spikes appearing in the cepstrum at values of seven (7) and thirteen (13) are three frequency units to either side of the center of the cepstrum, which occurs at the value ten (10). In this regard, the method may include the step of thresholding the cepstrum to find the spikes. For example, a filter to enhance the replicated object signal may be required to at least modify (220) or zero out the cepstral coefficients corresponding to the main lobe in the center of the cepstrum (e.g., at the value of 10), and optionally modifying (220) at least the cepstral coefficients corresponding to at least the replicated object signature and amplification factor by applying a gain factor greater than unity to the spiked areas around the quefrency values of seven (7) and thirteen (13) to enhance the first replicated object signature in the spatial quefrency domain. Referring to FIGS. 7A–7B, the standard deviation of the Gaussian noise is now 0. 1, such that the amplitude signal-to-noise ratio is reduced by half relative to the signal depicted in FIG. 6A–6B. However, the spikes in the cepstrum are reduced only from a peak of 4.0 in the signal depicted in FIGS. 6A–6B, to a peak of 3.5 in the image data illustrated in FIGS. 7A–7B, which is a reduction of 0.875, which is greater than 0.5. Since the noise level remains essentially at a value of one (1), the cepstrum does not suffer nearly so much loss as the loss in signal-to-noise ratio in the time series domain. The step of modifying (220) the cepstral coefficients corresponding to the first replicated object signature may comprise applying a gain factor greater than unity around the quefrency values of seven (7) and thirteen (13) to enhance the first replicated object signature prior to returning the image data to the pixel domain and/or the cepstral coefficients corresponding to the corruption to attenuate the corruption signal by zeroing out the cepstral coefficients corresponding to the main lobe (e.g., around the value of ten (10)) in the cepstrum. In particular, a gain factor of 1/0.875 would result in triangles in the time domain which are on the order of the triangles which have half the noise level. The method may include the step of thresholding in the cepstrum to find the spikes. For comparison purposes, FIGS. 8A–8B illustrate plots of a single triangle signal and the associated cepstrum. It should be noted that no dominant spikes appear in this cepstrum. This example is typical in that a very robust algorithm results from the use of cepstral techniques. As such, the probability of detection is high with a low probability of false alarm.

Figure 9:
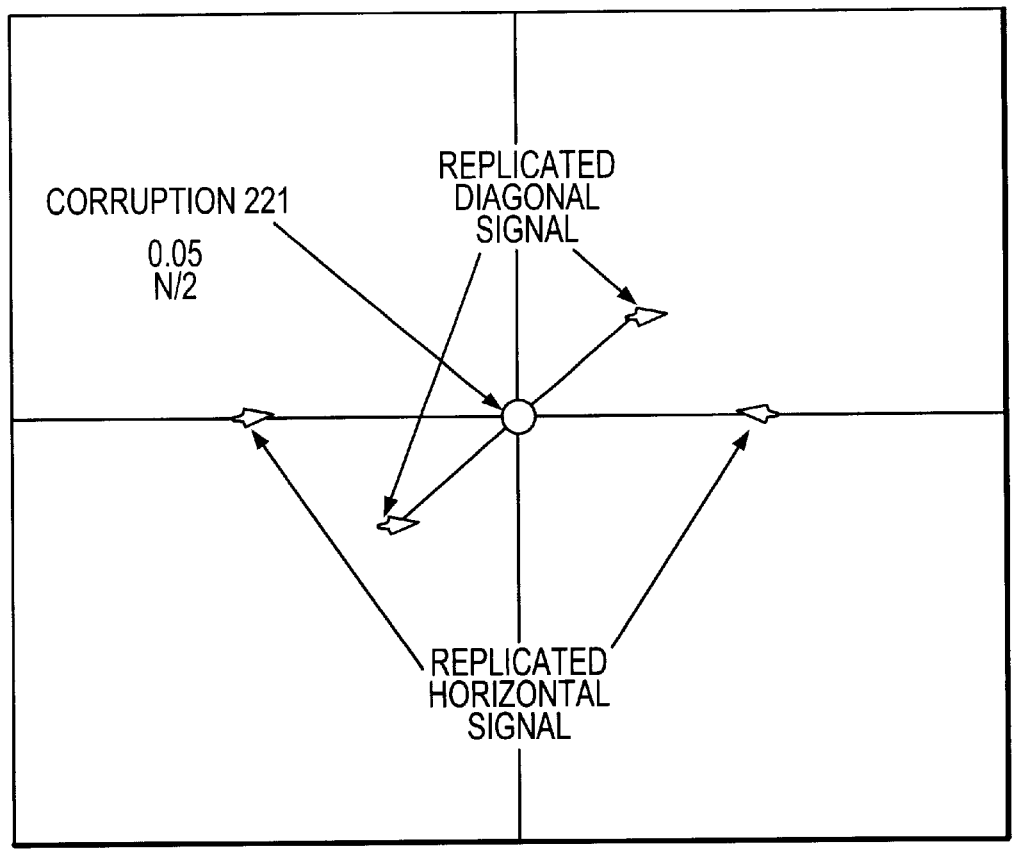
FIG. 9 is a plot of a replicated signal and corruption in the cepstrum.

Referring back to FIG. 5, if desired, the method of the present invention allows detection of the replicated object in the spatial quefrency domain. In this regard, this embodiment of the method of the present invention includes the step of mapping (222) at least a portion of the cepstral coefficients corresponding to at least the replicated object signature to produce a displayable representation of at least the cepstral coefficients corresponding to the replicated object signature, and displaying (224) at least the displayable representation of at least the replicated object signature. Specifically, and referring to FIG. 9, for imagery with a replicated object signature, smaller bright spots may appear in the mapped cepstrum, where the spacing between the center of the two dimensional cepstrum and the bright spots corresponds to the spacing of the replicated object signature in the pixel domain. Regardless of whether the corruption signal or energy is convolved or added in the pixel domain, the corresponding energy in the spatial quefrency domain is concentrated in the center of the two dimensional cepstrum with the replicated object signature in the image being somewhat removed therefrom as shown in FIG. 9 for an "N×N" input pixel image. The black circle (221) containing the corruption may be zeroed out and any replicated object signature can be boosted by the application of a gain greater than unity to the appropriate regions before the step of applying (232) the Fourier transform (which is described in more detail hereinbelow). In the example illustrated in FIG. 9, the behavior of a signal replicated in the horizontal direction is depicted. Replication along other lines in the pixel domain would appear as bright spots along a line in that same direction in the cepstrum as indicated in FIG. 9 for a signal along the diagonal.

This embodiment of the method of the present invention further includes the step of processing the cepstral coefficients corresponding at least to the portion of the enhanced replicated object signature and the amplification factor to obtain at least a portion of the enhanced replicated object signature in the pixel domain. In particular, and referring to back to FIG. 5, the step of processing the cepstral coefficients to obtain the enhanced replicated object signature in the pixel domain includes the steps of applying (232) a two-dimensional Fourier transform to transform the cepstral coefficients corresponding to at least the portion of the enhanced replicated object signature and the amplification factor in the spatial quefrency domain to a complex logarithm of the spatial frequency of at least the portion of the enhanced replicated object signature and a complex logarithm of the amplification factor. This step is applied to reverse the step of applying (218) the inverse Fourier transform described hereinabove. The step of processing the cepstral coefficients corresponding to at least the portion of the enhanced first replicated object signature and the amplification factor further includes the step of applying (234) an inverse complex logarithm to the complex logarithm of the spatial frequency of at least the portion of the enhanced replicated object signature and the amplification factor, the output of which is a spatial frequency of at least the portion of the enhanced replicated object signature and the amplification factor in the spatial frequency domain. This step functions to reverse the step of applying (216) the complex logarithm described hereinabove. Finally, the processing step includes applying (236) a two-dimensional inverse Fourier transform to transform at least the spatial frequency of at least a portion of the enhanced replicated object signature and the amplification factor into at least the portion of the enhanced replicated object signature in the pixel domain. This inverse Fourier transform step is applied to reverse the step of applying (214) the Fourier transform described hereinabove. Thereafter, the enhanced replicated object may be displayed (242) in the pixel domain for detection and/or classification of at least a portion of the enhanced replicated object.

As noted herein, the cepstral methodology is particular useful for processing SAR image data to detect replicated objects, such as mine arrays, the signatures of which may be imbedded in the real SAR image clutter. Performance of the cepstral process for SAR image mine array detection may be measured by a quantity called the array to background ratio ("ABR"), which is given below:

Mine to Background Ratio ("MBR")=N/D,
where N=max {mine pixel}-average clutter, D=average clutter;
MBR<0→Set MBR=1;
Given an array of mines $M_j$, j=1,2, . . . ,J, the ABR is the geometric mean of the $MBR_j$'s, which is chosen due to human factors considerations. Thus, where "Π" indicates a product and "Σ" indicates a sum:

$ABR=(\Pi_{j=1,j} MBR_j)^{1/j} \to dB[ABR]=20 \log ((\Pi_{j=1,j} MBR_j)^{1/j})$ $=(20/J) \log (\Pi_{j=1,j} MBR_j)$ $=(1/J)\Sigma_{j=1,j} 20 \log (MBR_j)$ $=(1/J)\Sigma_{j=1,j} dB[MBR_j]$ Also: $\ln (ABR)=(1/J) \ln (\Pi_{j=1,j} MBR_j)=(1/J)\Sigma_{j=1,j} \ln (MBR_j)$:

Normal by CLT→ABR: Lognormal.

Using the above-described cepstral filter methodology for a SAR image mine array imbedded in real SAR image clutter at −0.4 dB ABR resulted in a 6.9 dB ABR increase. The cepstral filter methodology amplifies array structures (e.g., replicated objects, such as mine arrays) by virtue of the Fourier Translation Theorem for two dimensions. The above-referenced functions "R(u,v)" and "H(u,v)" reflect the action of the Fourier Translation Theorem for two dimensions as described hereinabove, which shows how the replicated structure can be amplified using the cepstral methodology described herein.

Figure 10:
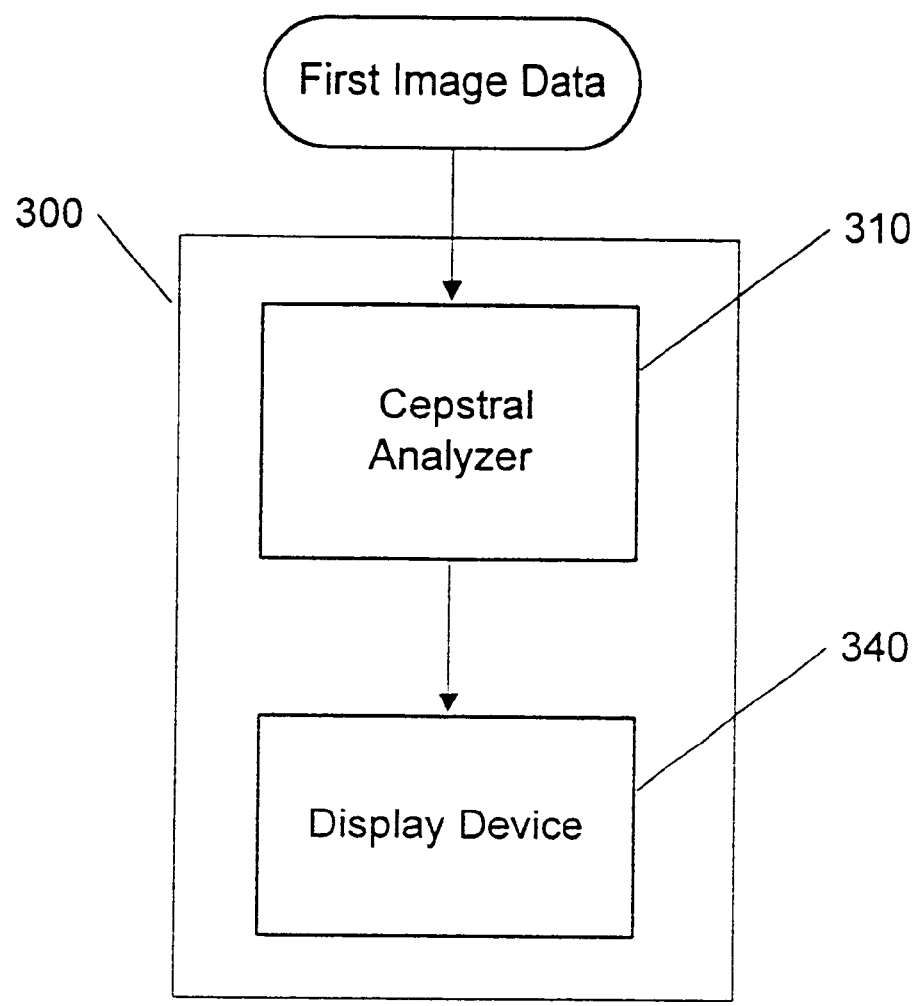
FIG. 10 shows a diagrammatic illustration of one embodiment of the system of the present invention.
Figure 11:
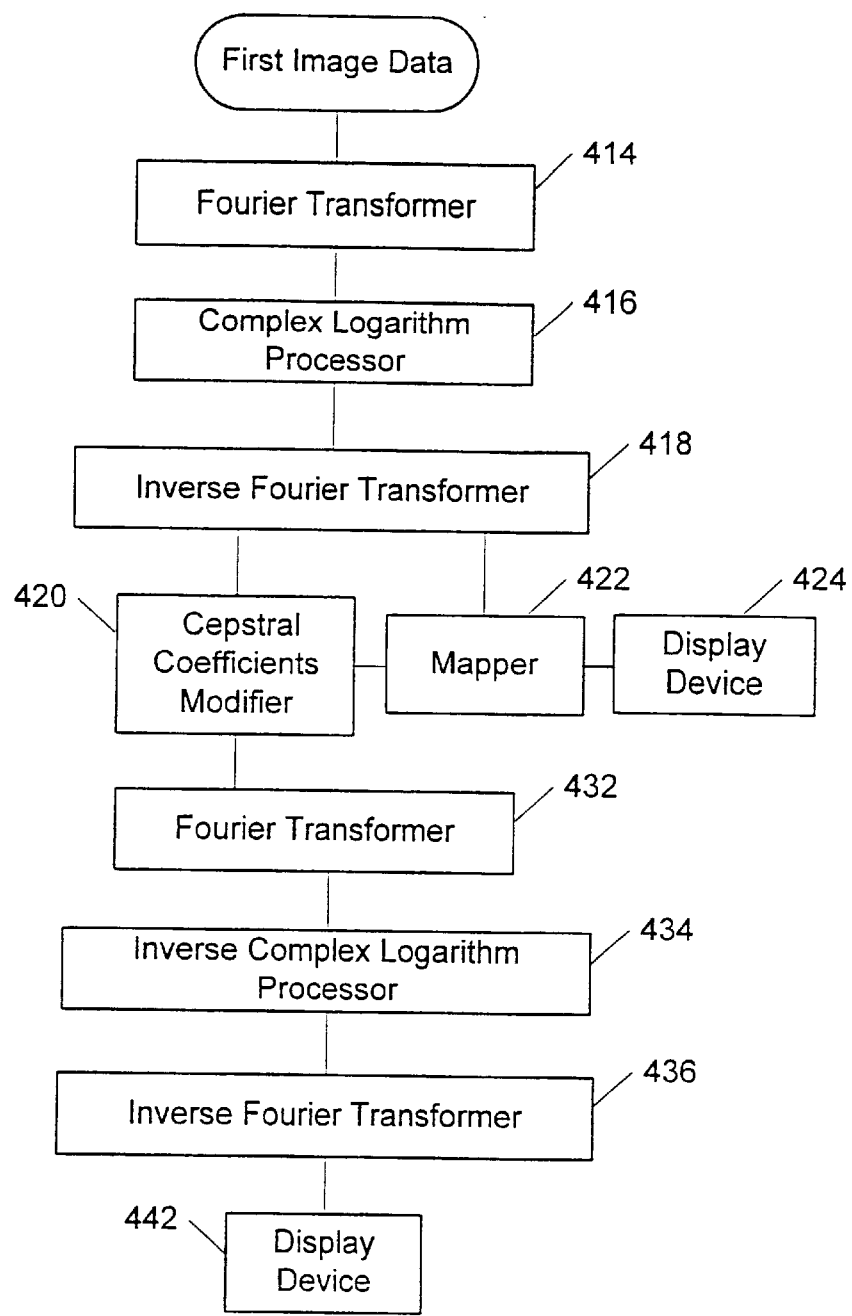
FIG. 11 shows a diagrammatic illustration of another embodiment of the system of the present invention.

In another aspect of the present invention, a system (300) for detecting and/or classifying at least one of a first, discrete cultural object and a first replicated object is disclosed. As illustrated in FIG. 10, one embodiment of the system (300) includes a means (310) for performing a cepstral analysis on the image data to attenuate at least a portion of the corruption signal in the image data and/or enhance at least one of a discrete cultural object signal and a replicated object signature in the image data which corresponds to a discrete cultural object and a replicated object, respectively, and a means (340) for displaying an output of the means for performing in the pixel domain and/or a spatial frequency domain to detect and/or classify the discrete cultural object and/or the replicated object. More specifically, and referring to FIG. 11, in one embodiment, the means for performing a cepstral analysis includes a two-dimensional Fourier transformer (414) for transforming the image data in the pixel domain to a discrete term, which is the product of the spatial frequencies of the cultural object signal and the corruption signal in the spatial frequency domain, and/or a replicated term, which is the product of an amplification factor and the spatial frequencies of the replicated object signature and the corruption signal. For purposes of analyzing the image data which may contain both a cultural object and a replicated object to detect a cultural object or a replicated object, the means for performing a cepstral analysis further includes first and/or second linear filters (not shown), the first filter operating to pass only the discrete term relating to the discrete cultural object, and the second linear filter operating to pass only the replicated term corresponding to the replicated object. As illustrated in FIG. 11, the means for performing the cepstral analysis further includes a complex logarithm processor (416) for applying a complex logarithm to the discrete term and/or the replicated term to obtain a discrete sum and/or a replicated sum, respectively, the discrete sum including a sum of the complex logarithms of the spatial frequencies of the cultural object and corruption signals, and the replicated sum including a sum of the complex logarithms of the amplification factor and the spatial frequencies of the replicated object signature and the corruption signal. The object of taking the complex logarithm is to take advantage of the property that the logarithm of a product is equal to the sum of the logarithms of the individual factors of the product, plus a phase term. Each factor of interest, either for retention (e.g., cultural object, replicated object) or rejection (e.g., corruption) is thus represented as a term in a sum. As such, the means for performing a cepstral analysis on the image data further includes an inverse two-dimensional Fourier transformer (418) for transforming the discrete sum and/or the replicated sum into cepstral coefficients corresponding to the cultural object signal and the corruption signal and/or the replicated object signature, the amplification factor and the corruption signal in the spatial quefrency domain.

In one embodiment, where it is desireable and/or possible to detect the cultural object and/or the replicated object in the spatial quefrency domain, the system includes a means (422) for mapping the cepstral coefficients corresponding to the cultural object and/or the replicated object as displayable representations in the spatial quefrency domain to thereby detect the cultural object and/or the replicated object. The system further includes a display device (424) for displaying such representations to detect the cultural object and/or the replicated object. In instances where the image data contains corruption signals, the means for performing the cepstral analysis further includes a cepstral coefficients modifier (420) for attenuating at least a portion of the corruption signal in the spatial quefrency domain, such that at least portions of the cepstral coefficients corresponding to the cultural object and/or the replicated objects remain in the spatial quefrency domain. In the spatial quefrency domain, cepstral coefficients corresponding to the cultural object signal and/or the replicated object signature may also be modified by the cepstral coefficients modifier (420) to accentuate the cultural object signal and/or the replicated object signature by applying a gain factor greater than unity to the appropriate cepstral coefficients.

For purposes of transforming the image data back to the pixel domain, means for performing the cepstral analysis further includes a two-dimensional Fourier transformer (432) for transforming the cepstral coefficients corresponding to the cultural object signal and/or the replicated object signature and the first amplification factor in the spatial quefrency domain to a complex logarithm of the spatial frequencies of at least a portion of cultural object signal and/or the replicated object signature and the amplification factor. In order to reverse the complex logarithm process described hereinabove, the means for performing a cepstral analysis further includes an inverse complex logarithm processor (434), the output of which includes the spatial frequency of at least a portion of the cultural object signal and/or a portion of the replicated object signature and the amplification factor. And, in order to reverse the inverse Fourier transformer described hereinabove, the means for performing a cepstral analysis includes an inverse Fourier transformer (436) to transform the spatial frequency of at least the portion of the cultural object signal and/or the replicated object signature and the amplification factor into the cultural object signal and the replicated object signature in the pixel domain. Thereafter, the cultural object and/or the replicated object are visually displayable via the display device (442) for detection and/or classification by a human operator/viewer.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for detecting at least a first cultural object using at least first image data from one of a first optical, a first infrared and a first synthetic aperture radar image, wherein the first image data includes signals corresponding to noise and to at least a first cultural object convolved with corruption, said method comprising the steps of:

processing the first image data from a pixel domain into the spatial quefrency domain to produce from said corruption and at least the first cultural object signals separable cepstral coefficients corresponding to at least the first cultural object and corruption signals in the spatial quefrency domain;

processing in the spatial quefrency domain at least a first cepstral coefficient corresponding to the corruption signal to attenuate at least a portion of the corruption signal, wherein at least a first cepstral coefficient corresponding to at least a portion of at least the first cultural object signal remains; and processing at least the first cepstral coefficient corresponding to at least the portion of the first cultural object signal in the spatial quefrency domain to obtain at least the portion of at least the first cultural object signal corresponding to at least the first cultural object in the pixel domain, wherein at least a portion of the first cultural object is displayable.

2. A method, as claimed in claim 1, further comprising the step of:

displaying at least the portion of the first cultural object corresponding to the portion of the first cultural object signal in the pixel domain.

3. A method, as claimed in claim 1, wherein said processing said first image data step comprises the steps of:

applying a two-dimensional Fourier transform to the first image data in the pixel domain to at least transform the first image data into at least a first discrete term, wherein the first discrete term comprises a product of a spatial frequency of at least the first cultural object signal and a spatial frequency of the corruption signal in the spatial frequency domain;

applying in the spatial frequency domain a complex logarithm to at least the first discrete term, wherein the output of the complex logarithm comprises a discrete sum, said discrete sum comprising a sum of the complex logarithm of the spatial frequency of at least the first cultural object signal and the complex logarithm of the spatial frequency of the corruption signal; and applying an inverse two-dimensional Fourier transform to the discrete sum to transform the discrete sum into at least the first cepstral coefficients corresponding to at least the first cultural object signal and the corruption signal in the spatial quefrency domain.

4. A method, as claimed in claim 1, wherein said processing in the spatial quefrency domain at least the first cepstral coefficient corresponding to the corruption signal step comprises the step of:

modifying at least the first cepstral coefficient corresponding to at least the corruption signal to attenuate at least the portion of the corruption signal.

5. A method, as claimed in claim 1, wherein said processing at least the first cepstral coefficient corresponding to at least the first cultural object signal step comprises the steps of:

applying a two-dimensional Fourier transform to transform at least the first cepstral coefficient corresponding to at least the portion of the first cultural object signal in the spatial quefrency domain to a complex logarithm of a spatial frequency of at least the portion of the first cultural object signal;

applying an inverse complex logarithm to the complex logarithm of the spatial frequency of at least the portion of the first cultural object signal, wherein the output of the inverse complex logarithm comprises a spatial frequency of the portion of at least the first cultural object signal in the spatial frequency domain; and applying a two-dimensional inverse Fourier transform to transform at least the spatial frequency of at least the portion of at least the first cultural object signal into at least the portion of at least the first cultural object signal in the pixel domain.

6. A method for detecting at least a first replicated object using at least first image data from one of a first optical, a first infrared and a first synthetic aperture radar image, the first replicated object comprising a plurality of objects arranged in a first array, wherein the first image data includes signals corresponding to corruption and at least a first replicated signature corresponding to at least the first replicated object, said method comprising the steps of:

processing the first image data from a pixel domain into a spatial quefrency domain to produce separable cepstral coefficients corresponding to at least a first amplification factor, the first replicated object signature and corruption signal in the spatial quefrency domain;

processing in the spatial quefrency domain at least a first cepstral coefficient corresponding to the corruption signal to attenuate at least a portion of the corruption signal, wherein at least a first cepstral coefficient corresponding to at least a portion of the first replicated object signature remains; and processing at least the first cepstral coefficients corresponding to at least the portion of the first replicated object signature and the first amplification factor to obtain an enhanced first replicated object signature corresponding to at least the portion of the first replicated object signature in the pixel domain, wherein at least a portion of the first replicated object is displayable in the pixel domain.

7. A method as claimed in claim 6, wherein said processing said first image data step comprises the steps of:

applying a two-dimensional Fourier transform to the first image data in the pixel domain to transform the first image data into at least a first replicated term, wherein the first replicated term comprises a product of the first amplification factor and a spatial frequency of each of the first replicated object signature and the corruption signal;

applying in a spatial frequency domain a complex logarithm to at least the first replicated term, wherein the output of the complex logarithm comprises a replicated sum, said replicated sum comprising a sum of the complex logarithm of the first amplification factor, the complex logarithm of the spatial frequency of the first replicated object signature and the complex logarithm of the spatial frequency of the corruption signal; and applying an inverse two-dimensional Fourier transform to the replicated sum to transform the replicated sum into at least the first cepstral coefficients corresponding to the first replicated object signature, the first amplification factor and the corruption signal in the spatial quefrency domain.

8. A method, as claimed in claim 7, further comprising, after said applying the inverse two-dimensional Fourier transform step, the step of:

mapping at least the first cepstral coefficients corresponding to the first replicated object signature and the first amplification factor in the spatial quefrency domain to produce at least a first displayable representation of at least the first cepstral coefficients corresponding to the first replicated object signature and the first amplification factor in the spatial quefrency domain, wherein the first replicated object is detectable.

9. A method, as claimed in claim 6, wherein said step of processing in the spatial quefrency domain at least the first cepstral coefficient corresponding to the corruption signal comprises the step of:

modifying at least the first cepstral coefficient corresponding to the corruption signal to attenuate at least the portion of the corruption signal.

10. A method, as claimed in claim 6, further comprising the step of:

modifying at least the first cepstral coefficients corresponding to the portion of the first replicated object signature and the first amplification factor to accentuate at least the portion of the first replicated object signature.

11. A method, as claimed in claim 6, wherein said step of processing at least the first cepstral coefficients corresponding to at least the portion of the first replicated object signature and the first amplification factor comprises the steps of:

applying a two-dimensional Fourier transform to transform at least the first cepstral coefficients corresponding to at least the portion of the first replicated object signature and the first amplification factor in the spatial quefrency domain to a complex logarithm of a spatial frequency of at least the portion of at least the first replicated object signature and a complex logarithm of the first amplification factor;

applying an inverse complex logarithm to the complex logarithm of the spatial frequency of at least the portion of the first replicated object signature and the first amplification factor, wherein the output of the inverse logarithm comprises a spatial frequency of at least the portion of the first replicated object signature and the first amplification factor in the spatial frequency domain; and applying a two-dimensional inverse Fourier transform to transform at least the spatial frequency of at least the portion of the first replicated object signature and first amplification factor into at least the portion of the enhanced first replicated object signature in the pixel domain.

12. A method, as claimed in claim 6, further comprising the step of:

displaying at least the portion of the enhanced first replicated object in the pixel domain.

13. A method for detecting at least a first cultural object using at least first image data from one of a first optical, a first infrared and a first synthetic aperture radar image, wherein the first image data includes signals corresponding to at least the first cultural object convolved with corruption, said method comprising the steps of:

applying a two-dimensional Fourier transform to the first image data in a pixel domain to at least transform the first image data into at least a first discrete term, wherein the first discrete term comprises a product of a spatial frequency of at least the first cultural object signal and a spatial frequency of the corruption signal in the spatial frequency domain;

applying in the spatial frequency domain a complex logarithm to at least the first discrete term, wherein the output of the complex logarithm comprises a discrete sum, said discrete sum comprising a sum of the complex logarithm of the spatial frequency of at least the first cultural object signal and the complex logarithm of the spatial frequency of the corruption signal;

applying an inverse two-dimensional Fourier transform to the discrete sum to transform the discrete sum into cepstral coefficients corresponding to at least the first cultural object signal and the corruption signal in a spatial quefrency domain; and processing in the spatial quefrency domain at least a first cepstral coefficient corresponding to the corruption signal to attenuate at least a portion of the corruption signal, wherein at least a first cepstral coefficient corresponding to at least a portion of the first cultural object remains.

14. A method, as claimed in claim 13, further comprising the steps of:

processing at least the first cepstral coefficient corresponding to at least the portion of the first cultural object signal to obtain at least the portion of the first cultural object signal corresponding to at least a portion of the first cultural object signature in the pixel domain, wherein at least the portion of the first cultural object is displayable.

15. A method, as claimed in claim 14, wherein said step of processing in the spatial quefrency domain at least the first cepstral coefficient corresponding to at least the portion of the corruption signal comprises the step of:

modifying at least the first cepstral coefficient corresponding to at least the corruption signal to attenuate at least the portion of the corruption signal.

16. A method, as claimed in claim 14, wherein said step of processing at least the first cepstral coefficient corresponding to at least the portion of the first cultural object signal comprises the steps of:

applying a two-dimensional Fourier transform to transform at least the first cepstral coefficient corresponding to at least the portion of the first cultural object signal in the spatial quefrency domain to a complex logarithm of the spatial frequency of at least the portion of at least the first cultural object signal;

applying an inverse complex logarithm to the complex logarithm of the spatial frequency of at least the portion of the first cultural object signal, wherein the output of the inverse logarithm comprises a spatial frequency of at least the portion of at least the first cultural object signal in the spatial frequency domain; and applying a two-dimensional inverse Fourier transform to transform at least the spatial frequency of the portion of at least the first cultural object signal into at least the portion of at least the first cultural object signal in the pixel domain.

17. A method, as claimed in claim 16, further comprising the step of:

displaying at least one of a representation of the first cultural object in the spatial quefrency domain and the portion of the first cultural object in the pixel domain.

18. A method for detecting at least a first replicated object using first image data from one of a first optical, a first infrared and a first synthetic aperture radar image, the first replicated object comprising a plurality of objects arranged in a first pattern, wherein the first image data includes signals corresponding to corruption and at least a first replicated object signature corresponding to at least the first replicated object, said method comprising the steps of:

applying a two-dimensional Fourier transform to the first image data in a pixel domain to transform the first image data into at least a first replicated term, wherein the first replicated term comprises a product of a first amplification factor and a spatial frequency of each of the first replicated object signature and the corruption signal in a spatial frequency domain;

applying in the spatial frequency domain a complex logarithm to at least the first replicated term, wherein the output of the complex logarithm comprises a replicated sum, said replicated sum comprising a sum of the complex logarithm of the first amplification factor, the complex logarithm of the spatial frequency of the first replicated object signature and the complex logarithm of the spatial frequency of the corruption signal; and applying an inverse two-dimensional Fourier transform to the replicated sum to transform the replicated sum into the cepstral coefficients corresponding to the first replicated object signature, the first amplification factor and the corruption signal in a spatial quefrency domain, wherein at least the first replicated object is detectable.

19. A method, as claimed in claim 18, further comprising the step of:

mapping at least first cepstral coefficients corresponding to the first replicated object signature and the first amplification factor in the spatial quefrency domain to produce at least a first displayable representation of at least one of the first cepstral coefficients corresponding to the first replicated object signature and the first amplification factor in the spatial quefrency domain.

20. A method, as claimed in claim 19, further comprising the step of:

displaying at least the first displayable representation of at least one of the first cepstral coefficients corresponding to the first replicated object signature and first amplification factor to detect at least the first replicated object.

21. A method, as claimed in claim 18, further comprising the steps of:

processing in the spatial quefrency domain at least a first cepstral coefficient corresponding to the corruption signal to attenuate at least a portion of the corruption signal, wherein at least the first cepstral coefficients corresponding to at least a portion of the first replicated object signature and the first amplification factor remain; and processing at least the first cepstral coefficients corresponding to at least the portion of the first replicated object signature and the first amplification factor to obtain an enhanced first replicated object signature corresponding to at least a portion of the first replicated object signature in the pixel domain, wherein at least a portion of the enhanced first replicated object is displayable.

22. A method, as claimed in claim 21, wherein said step of processing at least the first cepstral coefficients corresponding to at least the portion of the first replicated object signature and the first amplification factor comprises the step of:

modifying at least the first cepstral coefficient corresponding to at least the portion of the first replicated object signature to accentuate at least the portion of the first replicated object signature.

23. A method, as claimed in claim 21, wherein said step of processing at least the first cepstral coefficients corresponding to at least the portion of the first replicated object signature and the first amplification factor comprises the steps of:

applying a two-dimensional Fourier transform to transform at least the first cepstral coefficients corresponding to at least the portion of the first replicated object signature and the first amplification factor in the spatial quefrency domain to a complex logarithm of the spatial frequency of at least the portion of at least the first replicated object signature and the first amplification factor;

applying an inverse complex logarithm to the complex logarithm of the spatial frequency of at least the portion of the first replicated object signature and the first amplification factor, wherein the output of the inverse logarithm comprises a spatial frequency of at least the portion of at least the first replicated object signature and the first amplification factor in the spatial frequency domain; and applying a two-dimensional inverse Fourier transform to transform at least the spatial frequency of at least the portion of at least the first replicated object signature and the first amplification factor into at least the portion of at least the enhanced first replicated object signature in the pixel domain.

24. A method, as claimed in claim 23, further comprising the step of:

displaying at least the portion of the first replicated object corresponding to at least the portion of at least the enhanced first replicated object signature in the pixel domain.

25. A method for detecting at least one of a first cultural object and a first replicated object using at least first image data from one of a first optical, a first infrared and a first synthetic aperture radar image, the first replicated object comprising replicated objects, wherein the first image data in a pixel domain includes signals corresponding to noise and corruption and at least one of a first cultural object signal corresponding to the first cultural object and a first replicated object signature corresponding to at least the first replicated object, said method comprising the steps of:

performing a cepstral analysis on at least the first image data to at least one of attenuate a portion of the corruption signal and enhance at least one of the first cultural object signal and the first replicated object signature; and detecting at least one of the first cultural object and the first replicated object in at least one of a spatial quefrency domain and the pixel domain.

26. A method, as claimed in claim 25, wherein said detecting step comprises the step of:

displaying in at least one of the spatial quefrency domain and the pixel domain a first representation corresponding to the first replicated object to detect the first replicated object.

27. A method, as claimed in claim 25, wherein said detecting step comprises the step of:

displaying in at least one of the spatial quefrency domain and the pixel domain a first representation corresponding to the first cultural object to detect the first cultural object.

28. A method, as claimed in claim 25, wherein said performing step comprises the step of:

mapping a representation of at least one of the first cultural object signal and the first replicated object signature in the spatial quefrency domain.

29. A system for detecting at least one of a first cultural object and a first replicated object using at least first image data from one of a first optical, a first infrared and a first synthetic aperture radar image, the first replicated object comprising a plurality of objects arranged in a pattern, wherein the first image data in a pixel domain includes signals corresponding to noise and corruption and at least one of a first cultural object signal corresponding to the first cultural object and a first replicated object signature corresponding to at least the first replicated object, said system comprising:

means for performing a cepstral analysis on at least said first image data to at least one of attenuate a portion of the corruption signal and enhance at least the first replicated object signature; and means for displaying an output of said means for performing in at least one of the pixel domain and a spatial quefrency domain to detect at least one of the first cultural object and the first replicated object.

30. A system, as claimed in claim 29, wherein said means for performing the cepstral analysis comprises:

means for processing said first image data from the pixel domain into the spatial quefrency domain to obtain from said first image data separable cepstral coefficients corresponding to at least one of the first cultural object and corruption signals in the spatial quefrency domain and at least the first replicated object signature, a first amplification factor and the corruption signal in the spatial quefrency domain.

31. A system, as claimed in claim 30, wherein said means for performing further comprises:

means for mapping displayable representations of at least a first of said cepstral coefficients corresponding to at least one of the first cultural object and the first replicated object signature to detect at least one of the first cultural object and the first replicated object.

32. A system, as claimed in claim 30, wherein said means for processing said first image data comprises:

means for taking a two-dimensional Fourier transform of said first image data in the pixel domain to at least transform said first image data into at least one of a first discrete term and a first replicated term, said first discrete term including a product of spatial frequencies of at least the first cultural object signal and the corruption signal in a spatial frequency domain, said first replicated term including a product of a first amplification factor and the spatial frequencies of at least the first replicated object signature and corruption signal;

means for taking a complex logarithm in the spatial frequency domain of at least one of said first discrete term and said first replicated term to obtain at least one of a first discrete sum and a first replicated sum, respectively, said first discrete sum including a sum of the complex logarithms of the spatial frequencies of at least the first cultural object and corruption signals, said first replicated sum including a sum of the complex logarithms of the first amplification factor and the spatial frequencies of at least the first replicated object signature and the corruption signal; and means for taking an inverse two-dimensional Fourier transform of at least one of said first discrete sum and said first replicated sum to at least transform said at least one of said first discrete sum and said first replicated sum into said cepstral coefficients corresponding to at least one of said first cultural object signal and the corruption signal, and said first replicated object signature, the first amplification factor and the corruption signal in the spatial quefrency domain.

33. A system, as claimed in claim 30, wherein said means for performing further comprises:

means for mapping, in the spatial quefrency domain, at least a first of said cepstral coefficients corresponding to at least one of the first cultural object and the first replicated object signature to detect at least one of the first cultural object and the first replicated object signature.

34. A system, as claimed in claim 30, wherein said means for performing further comprises:

means for modifying at least a first of said cepstral coefficients corresponding to the corruption signal to substantially reject at least a portion of the corruption signal and to substantially retain at least a portion of at least one of said the first cultural object signal and the first replicated object signature and the first amplification factor.

35. A system, as claimed in claim 30, wherein said means for performing further comprises:

means for modifying at least a first of said cepstral coefficients corresponding to at least one of at least a portion of the first cultural object and the first replicated object signature to enhance at least one of the first cultural object signal and the first replicated object signature.

36. A system, as claimed in claim 30, wherein said means for performing further comprises:

means for processing at least a first of said cepstral coefficients corresponding to at least one of at least a portion of the first cultural object signal and at least a portion of the first replicated object signature and first amplification factor to obtain at least a portion of at least one of the first cultural object signal and an enhanced first replicated object signature in the pixel domain.

37. A system, as claimed in claim 30, wherein said means for performing further comprises:

means for taking a two-dimensional Fourier transform to transform said first of said cepstral coefficients corresponding to at least one of at least a portion of the first cultural object signal and at least a portion of the first replicated object signature and first amplification factor in the spatial quefrency domain to a complex logarithm of the spatial frequencies of at least one of at least the portion of the first cultural object signal and at least the portion the first replicated object signature and the first amplification factor;

means for taking, in the spatial frequency domain, an inverse complex logarithm to the complex logarithm of the spatial frequencies of at least one of at least the portion of the first cultural object signal and at least the portion of the first replicated object signature and the first amplification factor, wherein the output of the inverse logarithm comprises the spatial frequency of at least one of at least the portion of the first cultural object signal and at least the portion of the first replicated object signature and the first amplification factor; and means for taking a two-dimensional inverse Fourier transform to transform the spatial frequency of at least one of at least the portion of the first cultural object signal and at least the portion of the first replicated object signature and the first amplification factor into one of at least the portion the first cultural object signal and at least a portion of an enhanced first replicated object signature in the pixel domain.

* * * * *